(12) United States Patent
Miyake et al.

(10) Patent No.: US 9,865,871 B2
(45) Date of Patent: Jan. 9, 2018

(54) SILICON OXIDE AND STORAGE BATTERY

(71) Applicant: Semiconductor Energy Laboratory Co., Ltd., Atsugi-shi, Kanagawa-ken (JP)

(72) Inventors: Hiroyuki Miyake, Atsugi (JP); Nobuhiro Inoue, Isehara (JP); Takuya Hirohashi, Ebina (JP); Yuika Sato, Isehara (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 14/972,796

(22) Filed: Dec. 17, 2015

(65) Prior Publication Data

US 2016/0190576 A1    Jun. 30, 2016

(30) Foreign Application Priority Data

Dec. 26, 2014  (JP) .................. 2014-264926

(51) Int. Cl.
*H01M 4/48* (2010.01)
*C01B 33/113* (2006.01)
*H01M 10/0525* (2010.01)
*H01M 4/131* (2010.01)

(52) U.S. Cl.
CPC .......... *H01M 4/483* (2013.01); *C01B 33/113* (2013.01); *H01M 4/131* (2013.01); *H01M 10/0525* (2013.01); *Y02E 60/122* (2013.01)

(58) Field of Classification Search
CPC .................................... H01M 4/485
See application file for complete search history.

(56) References Cited

U.S. PATENT DOCUMENTS

| | | | |
|---|---|---|---|
| 7,303,838 B2 | 12/2007 | Morita et al. | |
| 7,491,467 B2 | 2/2009 | Satoh et al. | |
| 7,674,555 B2 | 3/2010 | Nanba et al. | |
| 7,776,473 B2 | 8/2010 | Aramata et al. | |
| 7,955,581 B2 | 6/2011 | Kogetsu et al. | |
| 8,835,047 B2 | 9/2014 | Morita et al. | |
| 9,490,080 B2 | 11/2016 | Inoue et al. | |
| 2003/0053945 A1 | 3/2003 | Fukuoka et al. | |
| 2004/0234856 A1 | 11/2004 | Morigaki et al. | |
| 2005/0233213 A1* | 10/2005 | Lee ............... | H01M 4/13 429/218.1 |
| 2006/0057433 A1 | 3/2006 | Ando et al. | |
| 2007/0224508 A1 | 9/2007 | Aramata et al. | |
| 2009/0104519 A1 | 4/2009 | Kim et al. | |
| 2009/0197168 A1 | 8/2009 | Nishida et al. | |
| 2010/0075227 A1 | 3/2010 | Morita et al. | |
| 2010/0178571 A1 | 7/2010 | Nanba et al. | |
| 2011/0236752 A1 | 9/2011 | Kawakami et al. | |
| 2011/0308935 A1 | 12/2011 | Yamazaki et al. | |
| 2012/0141866 A1 | 6/2012 | Kuriki et al. | |
| 2013/0078490 A1 | 3/2013 | Morita et al. | |
| 2013/0149605 A1 | 6/2013 | Kakehata et al. | |
| 2013/0164611 A1 | 6/2013 | Nanba et al. | |
| 2013/0224581 A1 | 8/2013 | Saito et al. | |
| 2014/0099539 A1 | 4/2014 | Yamazaki et al. | |
| 2015/0162590 A1 | 6/2015 | Takahashi et al. | |
| 2015/0340691 A1 | 11/2015 | Inoue et al. | |
| 2016/0020035 A1 | 1/2016 | Inoue et al. | |

FOREIGN PATENT DOCUMENTS

| | | | |
|---|---|---|---|
| EP | 2056379 A | | 5/2009 |
| JP | 2007-106634 A | | 4/2007 |
| KR | 101185088 B1 | * | 9/2012 |
| WO | WO-2013/051673 | | 4/2013 |

OTHER PUBLICATIONS

English abstract of Bak et al. KR 101185088 B1 (Sep. 2012).*
Yamada.M et al., "Reaction Mechanism of "SiO"-Carbon Composite-Negative Electrode for High-Capacity Lithium-Ion Batteries", J. Electrochem. Soc. (Journal of the Electrochemical Society), 2012, vol. 159, No. 10, pp. A1630-A1635.
Yamamura.H et al., "Investigation of the irreversible reaction mechanism and the reactive trigger on SiO anode material for lithium-ion battery", J. Ceram. Soc. Jpn.(Journal of the Ceramnic Society of Japan), 2011, vol. 119, No. 1395, pp. 855-860.
Park.C et al., "Characterizations and electrochemical behaviors of disproportionated SiO and its composite for rechargeable Li-ion batteries", J. Mater. Chem. (Journal of Materials Chemistry), May 10, 2010, vol. 20, No. 23, pp. 4854-4860.

* cited by examiner

*Primary Examiner* — Peter F Godenschwager
(74) *Attorney, Agent, or Firm* — Robinson Intellectual Property Law Office; Eric J. Robinson

(57) ABSTRACT

Silicon oxide which is an oxide containing at least silicon, in which part of silicon is replaced by boron, aluminum, or gallium, is provided.

27 Claims, 31 Drawing Sheets

FIG. 6
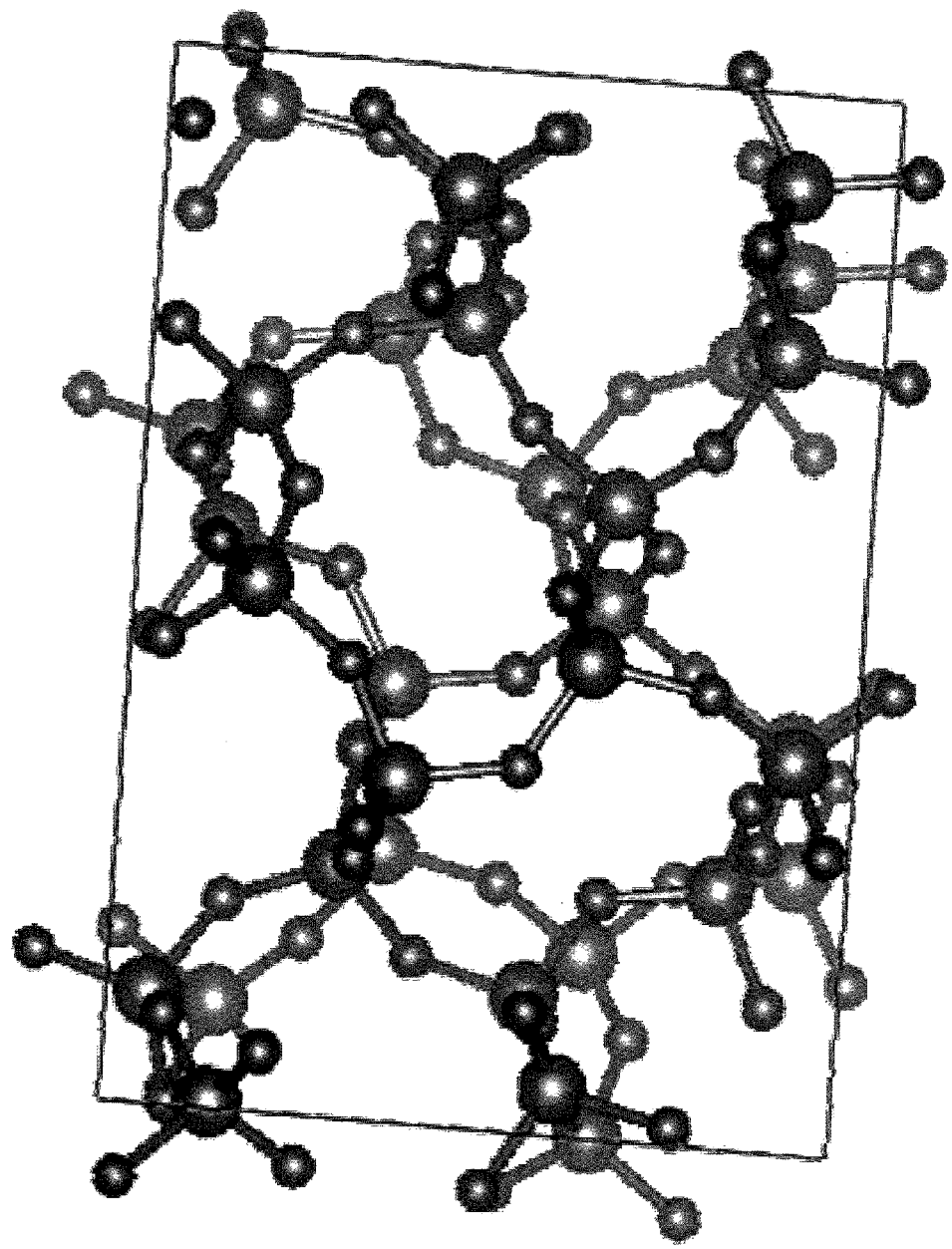
 Si
 O

- Si
- O
- B

- Si
- O
- Al

FIG. 9
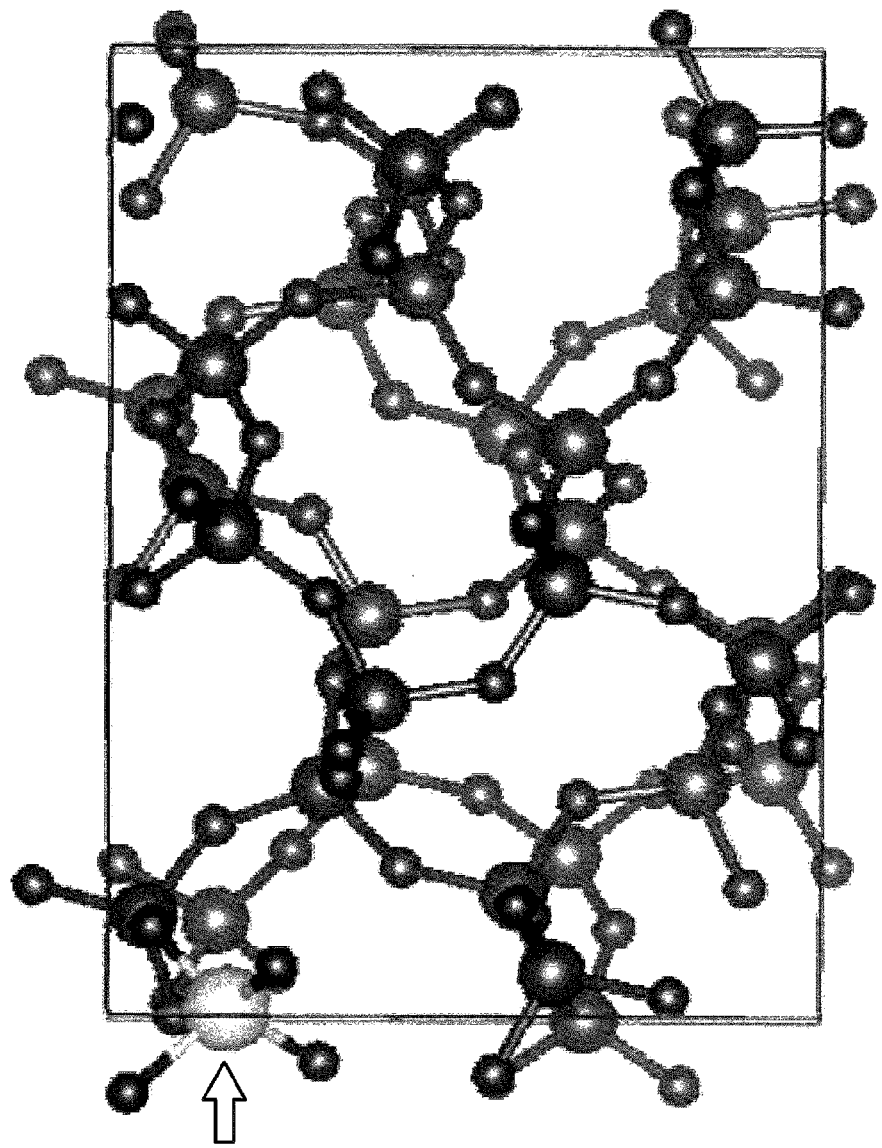
 Si
 O
 Ga

FIG. 10
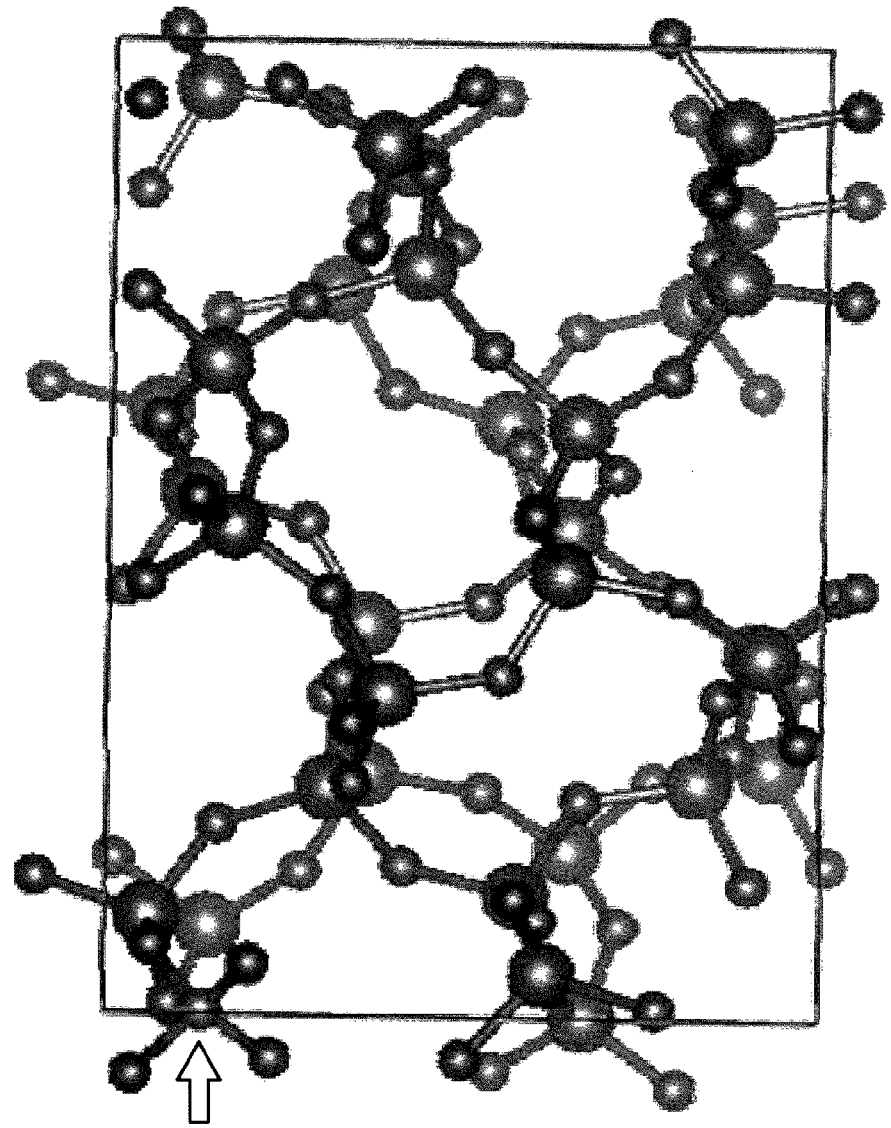
 Si
 O
 C

FIG. 22A
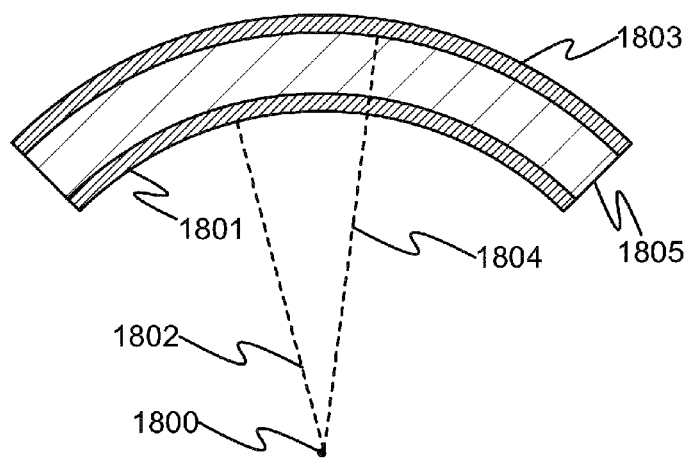
FIG. 22B
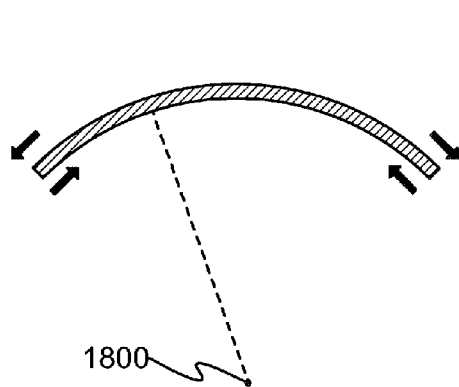
FIG. 22C
FIG. 22D

FIG. 24A
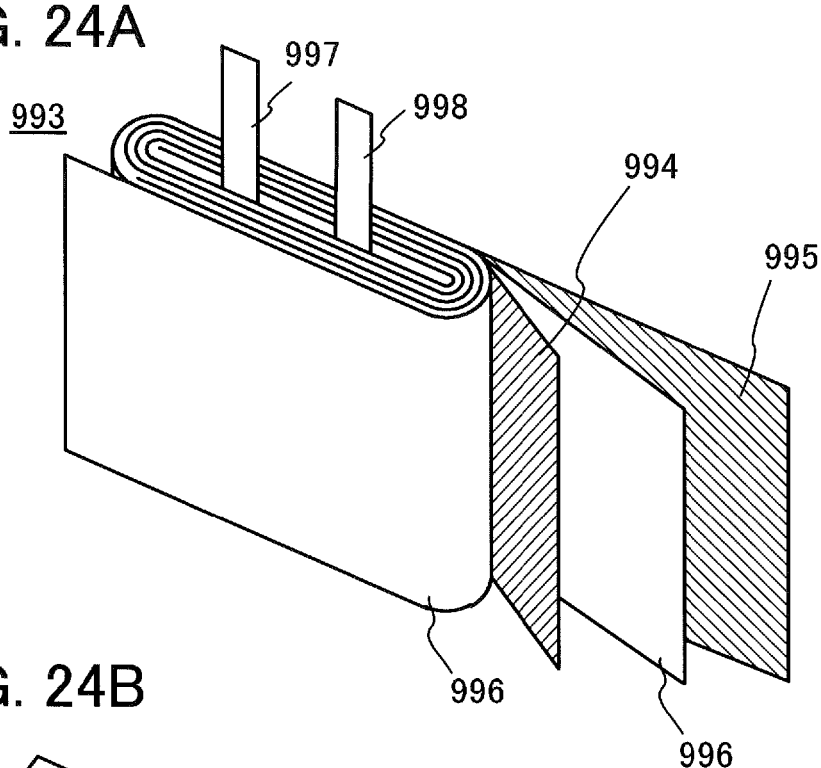
FIG. 24B
FIG. 24C
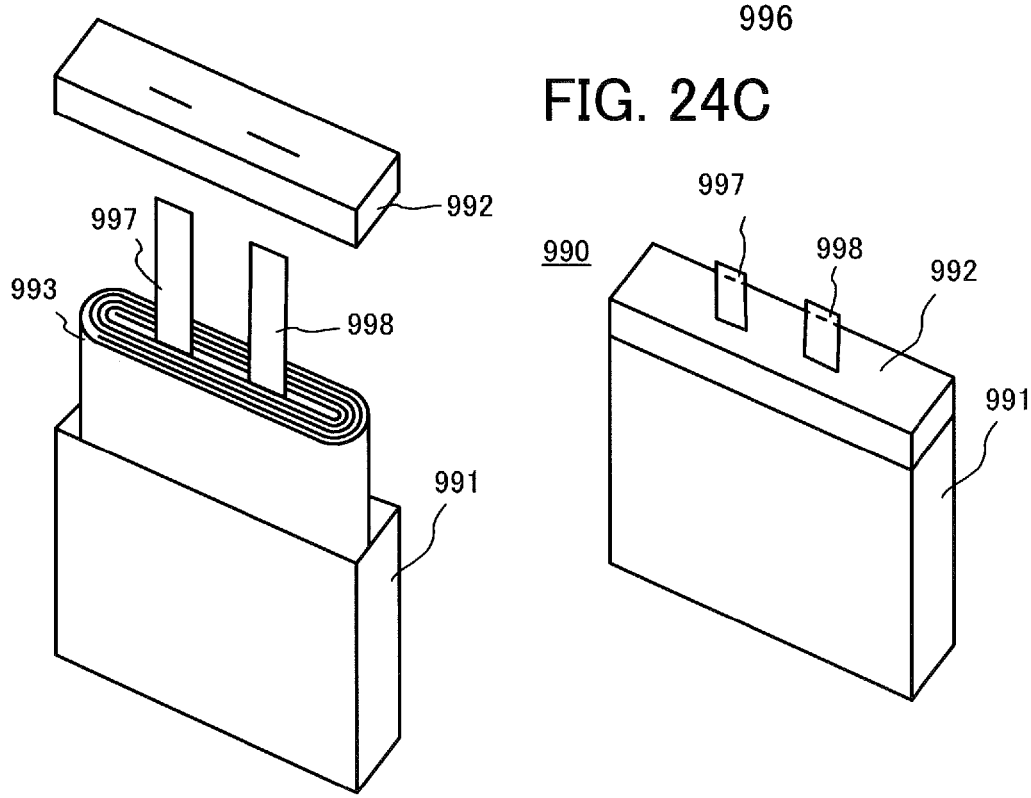

FIG. 26A1
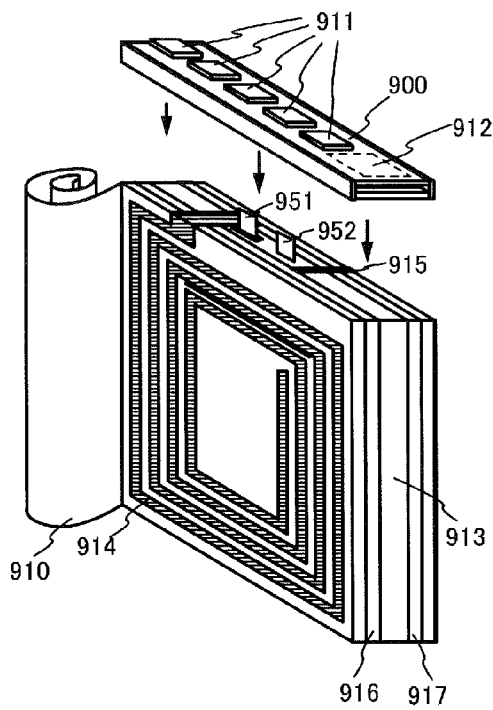
FIG. 26A2
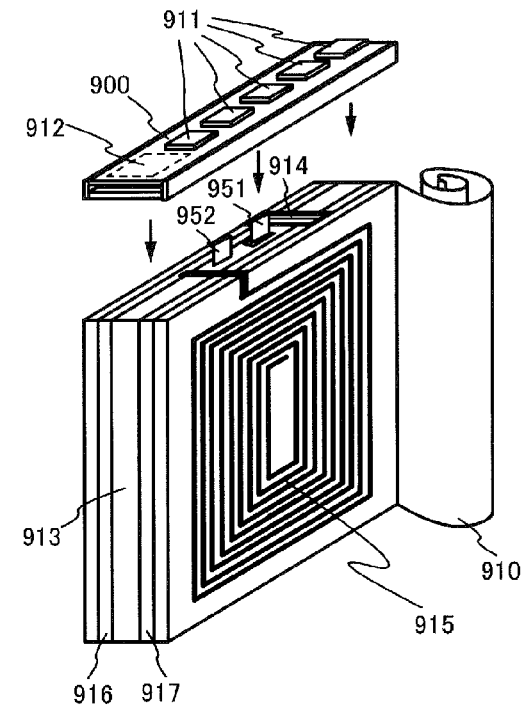
FIG. 26B1
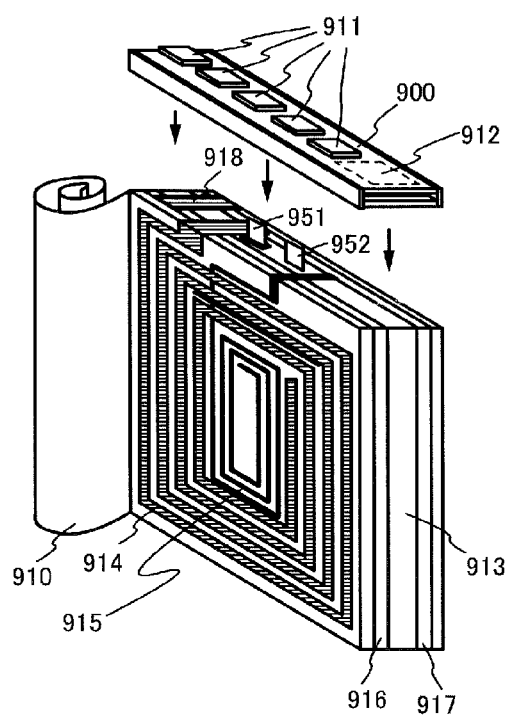
FIG. 26B2
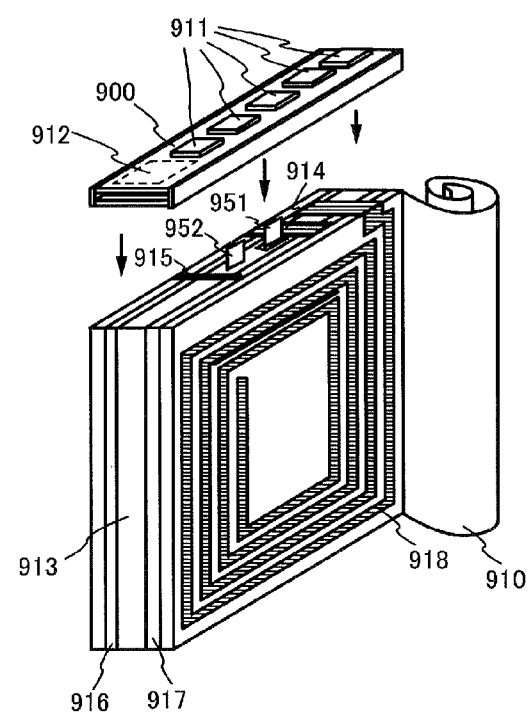

SILICON OXIDE AND STORAGE BATTERY

BACKGROUND OF THE INVENTION

1. Field of the Invention

One embodiment of the present invention relates to an object, a method, or a manufacturing method. In addition, one embodiment of the present invention relates to a process, a machine, manufacture, or a composition of matter. In particular, one embodiment of the present invention relates to a semiconductor device, a display device, a light-emitting device, a power storage device, a memory device, a driving method thereof, or a manufacturing method thereof. In particular, one embodiment of the present invention relates to a structure of a storage battery and a method for manufacturing the storage battery. In particular, one embodiment of the present invention relates to a negative electrode active material of a storage battery.

Note that in this specification, the power storage unit refers to all components and devices having a function of storing power.

2. Description of the Related Art

Examples of the storage battery include a nickel-metal hydride battery, a lead-acid battery, and a lithium-ion secondary battery.

Such secondary batteries are used as power sources in portable information terminals typified by mobile phones. In particular, lithium-ion secondary batteries have been actively developed because increased capacity and reduced size can be achieved.

In the lithium-ion secondary batteries, a graphite material is typically used as a negative electrode active material; as another material with high capacity, for example, silicon, tin, and oxides thereof are disclosed in Patent Document 1.

REFERENCE

Patent Document

Japanese Published Patent Application No. 2007-106634

SUMMARY OF THE INVENTION

Silicon has attracted attention as a negative electrode active material that has a higher theoretical capacity than conventional graphite-based materials and achieves a higher energy density. As an oxide of silicon, SiO (silicon monoxide) has been studied for use as a negative electrode active material; however, SiO materials are expensive, and thus less expensive oxides of silicon need to be developed.

An object of one embodiment of the present invention is to provide a novel negative electrode active material.

Another object of one embodiment of the present invention is to provide a negative electrode active material that can be fabricated at low costs.

Another object of one embodiment of the present invention is to provide a novel material. Another object of one embodiment of the present invention is to provide a novel battery. Another object of one embodiment of the present invention is to provide a novel power storage device. Another object of one embodiment of the present invention is to provide a novel lithium-ion secondary battery.

Note that the description of these objects does not exclude the existence of other objects. In one embodiment of the present invention, there is no need to achieve all the above objects. Other objects will be apparent from and can be derived from the description of the specification, the drawings, the claims, and the like.

One embodiment of the present invention is silicon oxide which is an oxide containing at least silicon and in which part of silicon is replaced by an atom M. The atom M is a Group 13 atom typified by boron, aluminum, or gallium.

In the above silicon oxide, the proportion of oxygen atoms to silicon atoms is greater than or equal to 1.5 and less than or equal to 2.5.

One embodiment of the present invention is the above silicon oxide in which the atom M and oxygen are bonded by an ionic bond or a covalent bond.

One embodiment of the present invention is the above silicon oxide in which the proportion of the atoms M to silicon atoms is greater than or equal to 0.01 and less than or equal to 0.11.

One embodiment of the present invention is a storage battery using a negative electrode active material including the above silicon oxide.

One embodiment of the present invention can provide a novel negative electrode active material.

One embodiment of the present invention can provide a negative electrode active material that can be fabricated at low costs.

One embodiment of the present invention can provide a novel material. One embodiment of the present invention can provide a novel battery. One embodiment of the present invention can provide a novel power storage device. One embodiment of the present invention can provide a novel lithium-ion secondary battery.

Note that the description of these effects does not exclude the existence of other effects. One embodiment of the present invention does not necessarily achieve all the effects listed above. Other effects will be apparent from and can be derived from the description of the specification, the drawings, the claims, and the like.

BRIEF DESCRIPTION OF THE DRAWINGS

In the accompanying drawings:

FIG. 6 shows a molecular structure model of $SiO_2$ used in calculation;

FIG. 9 shows a molecular structure model of silicon oxide used in calculation;

FIG. 10 shows a molecular structure model of silicon oxide used in calculation;

FIGS. 22A to 22D illustrate the curvature radius of a plane;

FIGS. 24A to 24C illustrate examples of a power storage device;

FIGS. 26A1 to 26B2 illustrate examples of a power storage device;

DETAILED DESCRIPTION OF THE INVENTION

Embodiments of the present invention will be described in detail below with reference to the drawings. However, the present invention is not limited to the description below, and it is easily understood by those skilled in the art that modes and details disclosed herein can be modified in various ways. Furthermore, the present invention is not construed as being limited to the description of the embodiments.

(Embodiment 1)

Although $SiO_2$ (silicon dioxide) is a relatively inexpensive material, it has a low electrode potential in Li insertion and therefore does not function as a negative electrode material of a lithium ion secondary battery. The inventors have thought of replacing an Si atom in $SiO_2$ with another atom having a different valence from Si and using the resulting material as a negative electrode active material. The negative electrode active material described below is silicon oxide obtained by replacing some of Si atoms in $SiO_2$ with Group 13 atoms (specifically, boron, aluminum, or gallium).

Note that in this specification, silicon oxide can refer to an oxide powder of silicon including a silicon-rich portion, and can be also referred to as $SiO_y$ ($1.5 \leq y \leq 2.5$). Examples of silicon oxide include a material containing $SiO_2$ and one or more of $Si_2O_3$, $Si_3O_4$, and $Si_2O$, and a mixture of Si powder and $SiO_2$. Note that, silicon oxide contains another atom (e.g., carbon, nitrogen, iron, aluminum, copper, titanium, calcium, or manganese) in some cases.

One embodiment of the present invention is silicon oxide which is an oxide containing at least Si and in which part of Si is replaced by an atom M. The atom M is a Group 13 atom typified by boron (B), aluminum (Al), or gallium (Ga). Note that the atom M may contain two or more kinds of atoms.

In the above silicon oxide, the proportion of O atoms to Si atoms is greater than or equal to 1.5 and less than or equal to 2.5.

Also in the above silicon oxide, the proportion of atoms M to Si atoms is preferably greater than or equal to 0.01 and less than or equal to 0.11. Note that the proportion is not limited to this range. When the proportion of atoms M to Si atoms is so low that few O atoms have a dangling bond, the silicon oxide does not function properly as a negative electrode active material in some cases. In contrast, when the proportion of atoms M to Si atoms is too high, the silicon oxide has an unstable molecular structure and does not function properly as a negative electrode active material in some cases.

The Si atom and the atom M are bonded by an ionic bond or a covalent bond.

Described below is the molecular structure of silicon oxide in which some of Si atoms are replaced by Group 13 atoms, here, for example, Al.

Figure 1A:
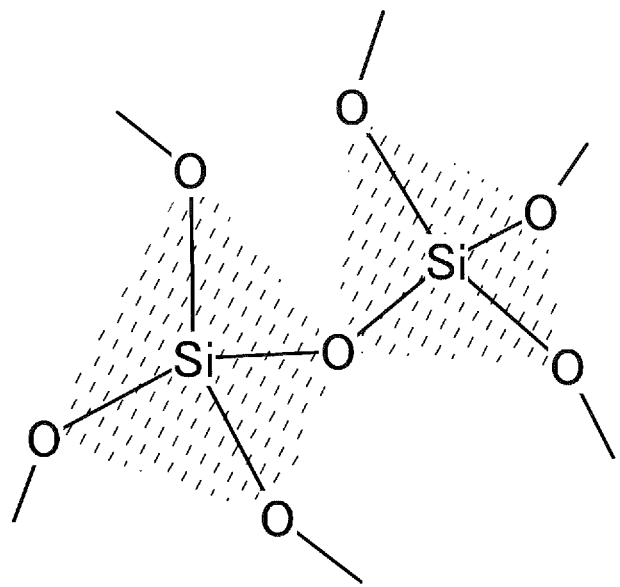
FIGS. 1A and 1B show molecular structures of $SiO_2$ and silicon oxide.

FIG. 1A shows a molecular structure of amorphous $SiO_2$. An Si atom is bonded to four O atoms by an ionic bond or a covalent bond. The four O atoms surrounding the Si atom are arranged to form a regular tetrahedral shape (hatching patterns in FIG. 1A). In addition, an O atom is bonded to two Si atoms. Since the Si atom has four bonds and the O atom has two bonds, the Si atoms and the O atoms in $SiO_2$ with such a molecular structure have no dangling bond.

Figure 1B:
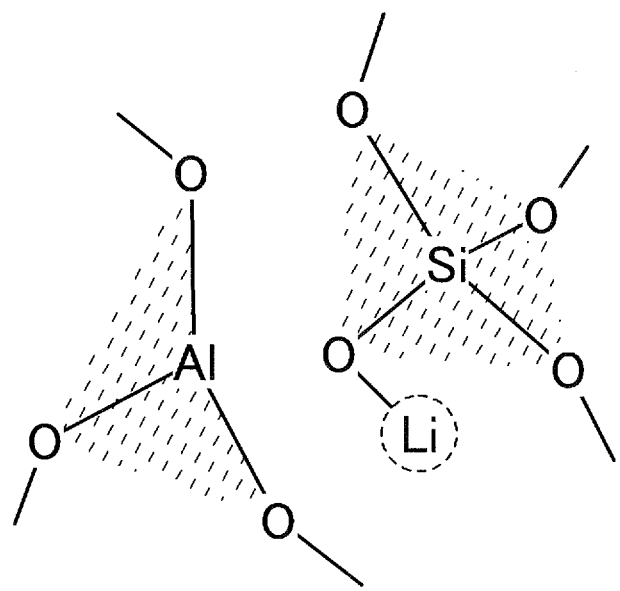

FIG. 1B shows a molecular structure of silicon oxide obtained by replacing an Si atom in $SiO_2$ shown in FIG. 1A with an Al atom. The Al atom has three bonds and therefore can be bonded to not more than three O atoms; as a result, an O atom near the Al atom replacing the Si atom has a dangling bond. When silicon oxide is used as a negative electrode active material, the O atom having the dangling bond is bonded to an Li atom, so that Li insertion into the negative electrode active material occurs. In other words, the silicon oxide obtained by replacing an Si atom in $SiO_2$ with a Group 13 atom, which has a valence less than that of Si by 1, functions as a negative electrode active material.

Figure 2:
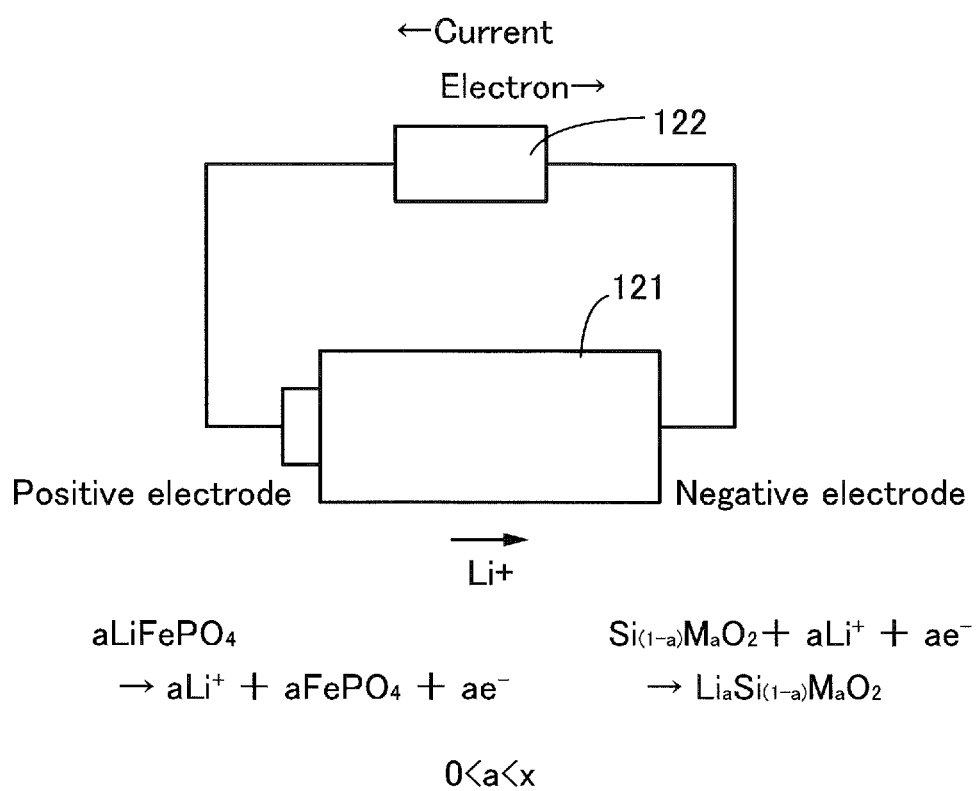
FIG. 2 is a schematic diagram of a storage battery in charging.
Figure 3:
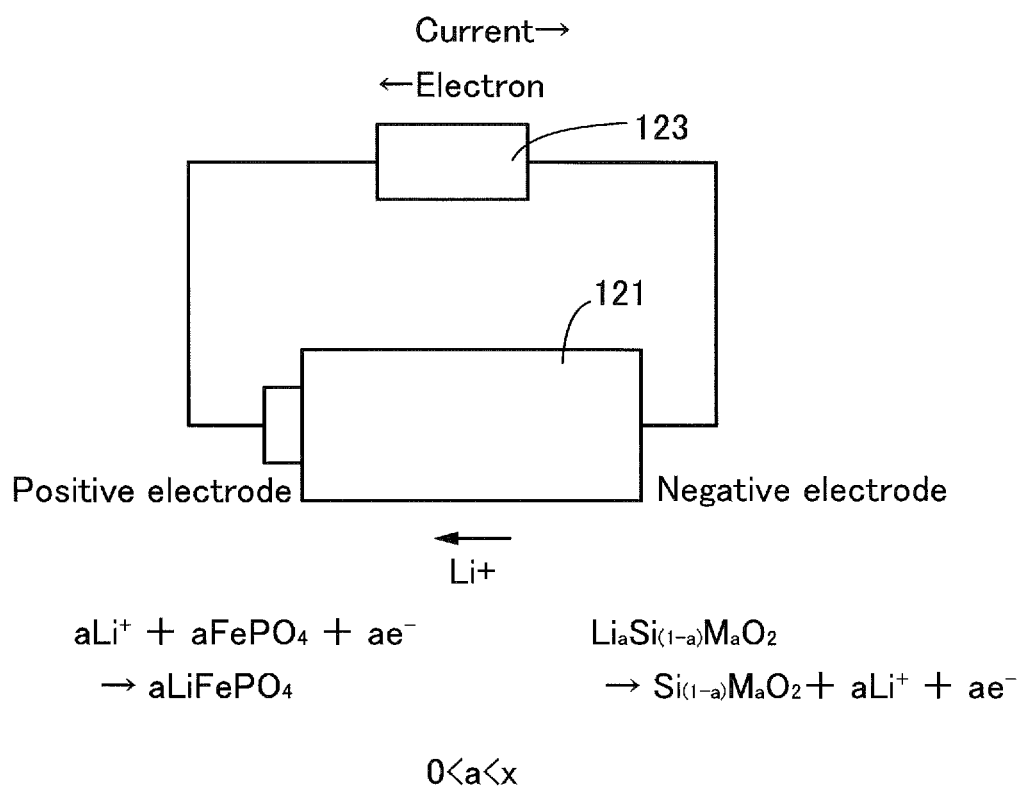
FIG. 3 is a schematic diagram of the storage battery in discharging.

A reaction of a battery using silicon oxide as a negative electrode active material will be described below; here, the operation of a storage battery using lithium iron phosphate ($LiFePO_4$) for a positive electrode will be described as an example. FIG. 2 shows charging of a storage battery 121 and FIG. 3 shows discharging of the storage battery 121. Note that here, M represents a Group 13 atom replacing an Si atom, and x is the atomic proportion of M to M and Si in silicon oxide.

FIG. 2 shows the connection between the storage battery 121 and a charger 122 in charging of the storage battery 121. In charging of the storage battery 121, a reaction occurring in the negative electrode is represented by Formula (1).

$$Si_{(1-a)}M_aO_2 + aLi^+ + ae^- \rightarrow Li_aSi_{(1-a)}M_aO_2 \quad (1)$$

A reaction occurring in the positive electrode is represented by Formula (2).

$$aLiFePO_4 \rightarrow aLi^+ + aFePO_4 + ae^- \quad (2)$$

In Formulae (1) and (2), 0<a<x is satisfied.

FIG. 3 shows the connection between the storage battery 121 and a load 123 in discharging of the storage battery 121. In discharging of the storage battery 121, a reaction occurring in the negative electrode is represented by Formula (3).

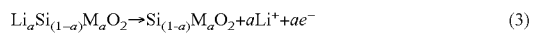

$$Li_aSi_{(1-a)}M_aO_2 \rightarrow Si_{(1-a)}M_aO_2 + aLi^+ + ae^- \quad (3)$$

A reaction occurring in the positive electrode is represented by Formula (4).

$$aLi^+ + aFePO_4 + ae^- \rightarrow aLiFePO_4 \quad (4)$$

In Formulae (3) and (4), 0<a<x is satisfied.

Note that the same applies to silicon oxide obtained by replacing Si with two or more kinds of atoms. For example, silicon oxide obtained by replacing Si with the atom M and an atom N is used as a negative electrode active material, and lithium iron phosphate is used for a positive electrode. A battery reaction in such a case will be described below as an example. Here, the atom N is a Group 13 atom different from the atom M.

Figure 4:
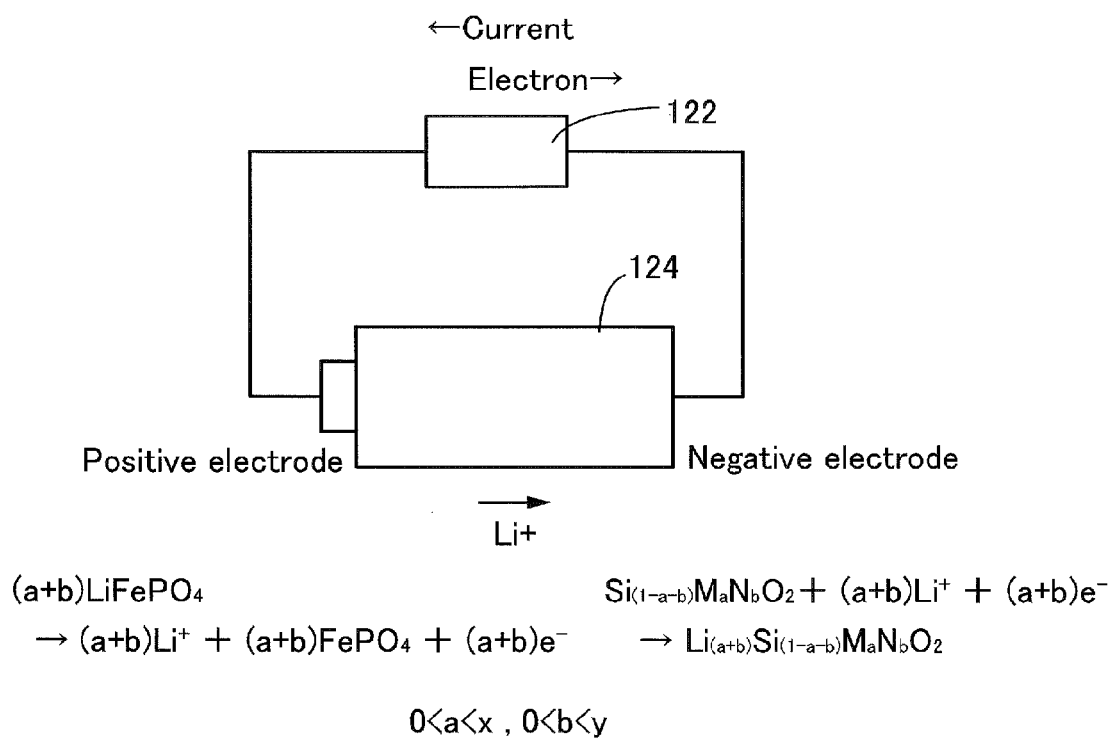
FIG. 4 is a schematic diagram of a storage battery in charging.
Figure 5:
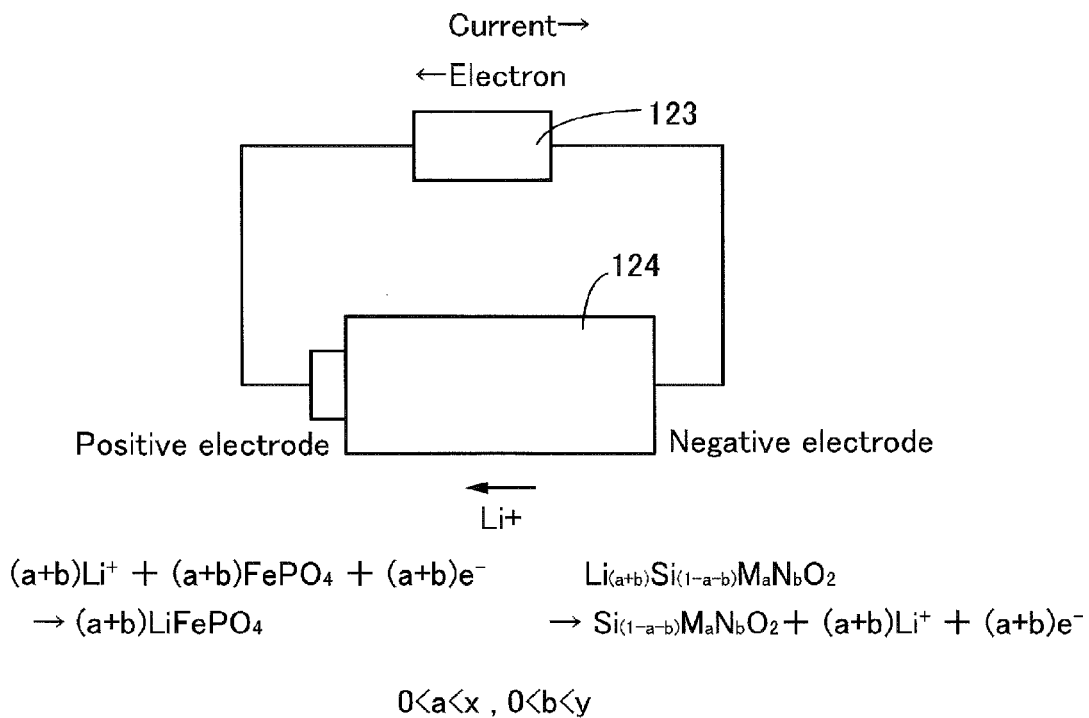
FIG. 5 is a schematic diagram of the storage battery in discharging.

FIG. 4 shows charging of a storage battery 124 and FIG. 5 shows discharging of the storage battery 124. Here, x is the proportion of the atom M to the atom M, the atom N, and Si in silicon oxide, and y is the proportion of the atom N to the atom M, the atom N, and Si in silicon oxide.

FIG. 4 shows the connection between the storage battery 124 and the charger 122 in charging of the storage battery 124. In charging of the storage battery 124, a reaction occurring in the negative electrode is represented by Formula (5).

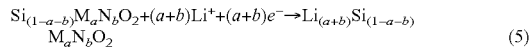

A reaction occurring in the positive electrode is represented by Formula (6).

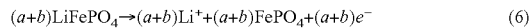

In Formulae (5) and (6), $0<a<x$ and $0<b<y$ are satisfied.

FIG. 5 shows the connection between the storage battery 124 and the load 123 in discharging of the storage battery 124. In discharging of the storage battery 124, a reaction occurring in the negative electrode is represented by Formula (7).

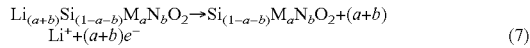

A reaction occurring in the positive electrode is represented by Formula (8).

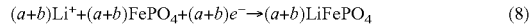

In Formulae (7) and (8), $0<a<x$ and $0<b<y$ are satisfied.

The atom M is preferably boron. As described in detail in Embodiment 2, replacement of Si with boron among other Group 13 atoms particularly increases the energy density of a storage battery using such silicon oxide as a negative electrode active material.

The silicon oxide of one embodiment of the present invention can be fabricated by, for example, mixing $SiO_2$ powder and powder of an oxide containing the atom M, melting the mixture at a high temperature, and then cooling it rapidly. Examples of the oxide containing the atom M include boron oxide ($B_2O_3$), aluminum oxide ($Al_2O_3$), and gallium oxide ($Ga_2O_3$).

The mixture of $SiO_2$ and a slight amount of aluminum oxide has a lower melting point than $SiO_2$ alone; hence, the mixture can be melted at a lower temperature in the fabrication of the silicon oxide. It is thus preferable to select aluminum as the atom M. The melting point of the mixture can be reduced by, for example, mixing $SiO_2$ powder and 1 wt % to 8 wt % of aluminum oxide powder.

Note that the molecular structure of the silicon oxide can be determined by, for example, electron spin resonance (ESR), nuclear magnetic resonance (NMR), or Raman spectroscopy, or using a Fourier transform infrared (FT-IR) spectrometer.

This embodiment can be implemented in appropriate combination with any of the other embodiments.

(Embodiment 2)

Described in this embodiment are the first principles calculation results of the open-circuit potential of the silicon oxide shown in Embodiment 1, which is obtained by replacing part of Si with any atom of boron, aluminum, gallium, and carbon. Note that in this specification, the open-circuit potential of an active material refers to a potential at which lithium is not inserted/extracted into/from an electrode using the active material when a voltage is applied between the electrode and a lithium electrode, i.e., an equilibrium potential. The open-circuit potential is represented by a potential difference with the lithium electrode set to 0 V.

The open-circuit potential of the three-dimensional silicon oxide is calculated using first principles calculation software VASP (Vienna Ab initio Simulation Package).

FIGS. 6 to 10 show the structures of $SiO_2$ and silicon oxides that are prepared to calculate the open-circuit potential using the first principles calculation. $SiO_2$ shown in FIG. 6 is referred to as $SiO_2$-A, and silicon oxides shown in FIGS. 7 to 10 are referred to as $SiO_2$—B, $SiO_2$—C, $SiO_2$-D, and $SiO_2$-E, respectively. Note that in this calculation, the lattice constant is assumed to undergo no change even when atoms are replaced.

FIG. 6 shows the molecular structure model of $SiO_2$-A. The nearest neighbor atoms of any Si atom are four O (oxygen) atoms, which are positioned at the vertices of a regular tetrahedron with the Si atom at the center. In each regular tetrahedral region, Si and O are bonded by a covalent bond or an ionic bond. Furthermore, an O atom occupies a vertex of two regular tetrahedral regions. That is, the nearest neighbor atoms of any O atom are two Si atoms. $SiO_2$-A can also be regarded as having an amorphous structure.

The molecular structure model in FIG. 6 includes 32 Si atoms and 64 O atoms. Note that all the Si atoms in FIG. 6 occupy crystallographically equivalent sites.

Figure 7:
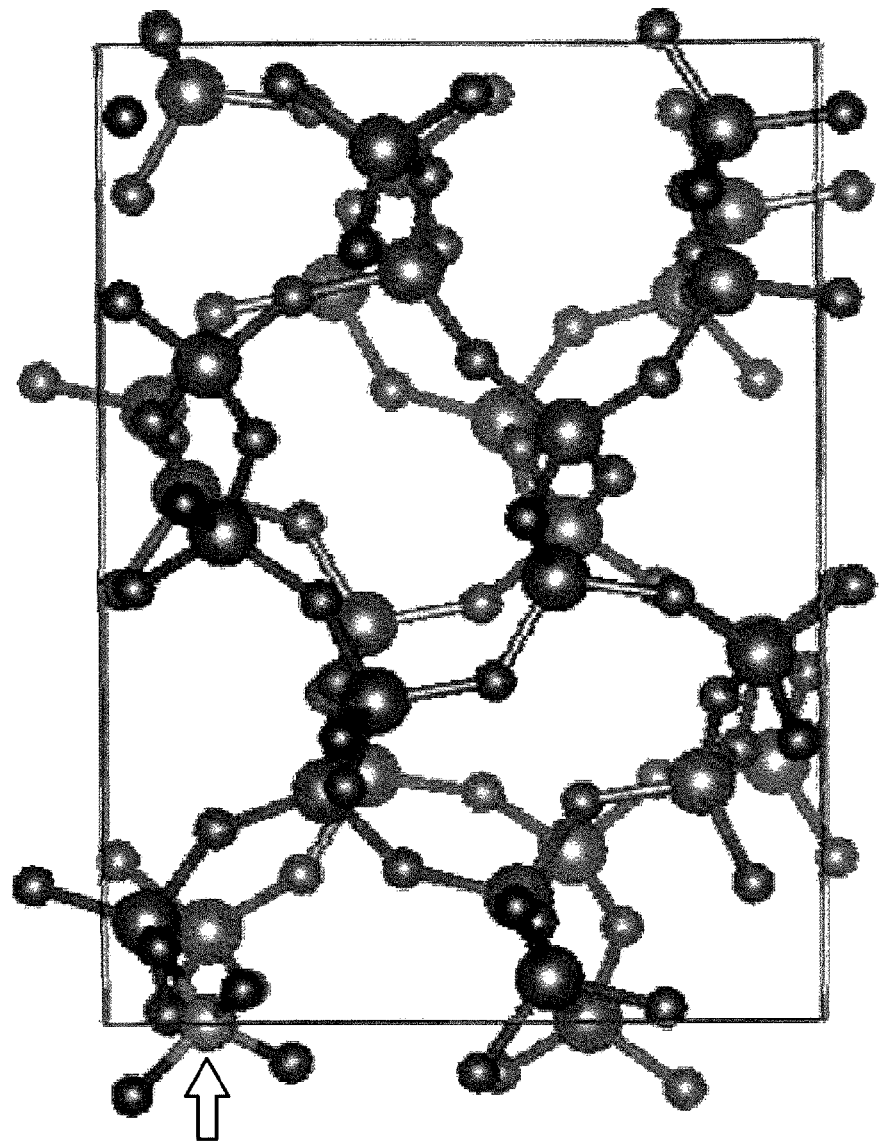
FIG. 7 shows a molecular structure model of silicon oxide used in calculation.

FIG. 7 shows the molecular structure model of $SiO_2$—B, which is different from that of $SiO_2$-A in that any Si atom (indicated by an arrow in FIG. 7) is replaced by a B (boron) atom.

Figure 8:
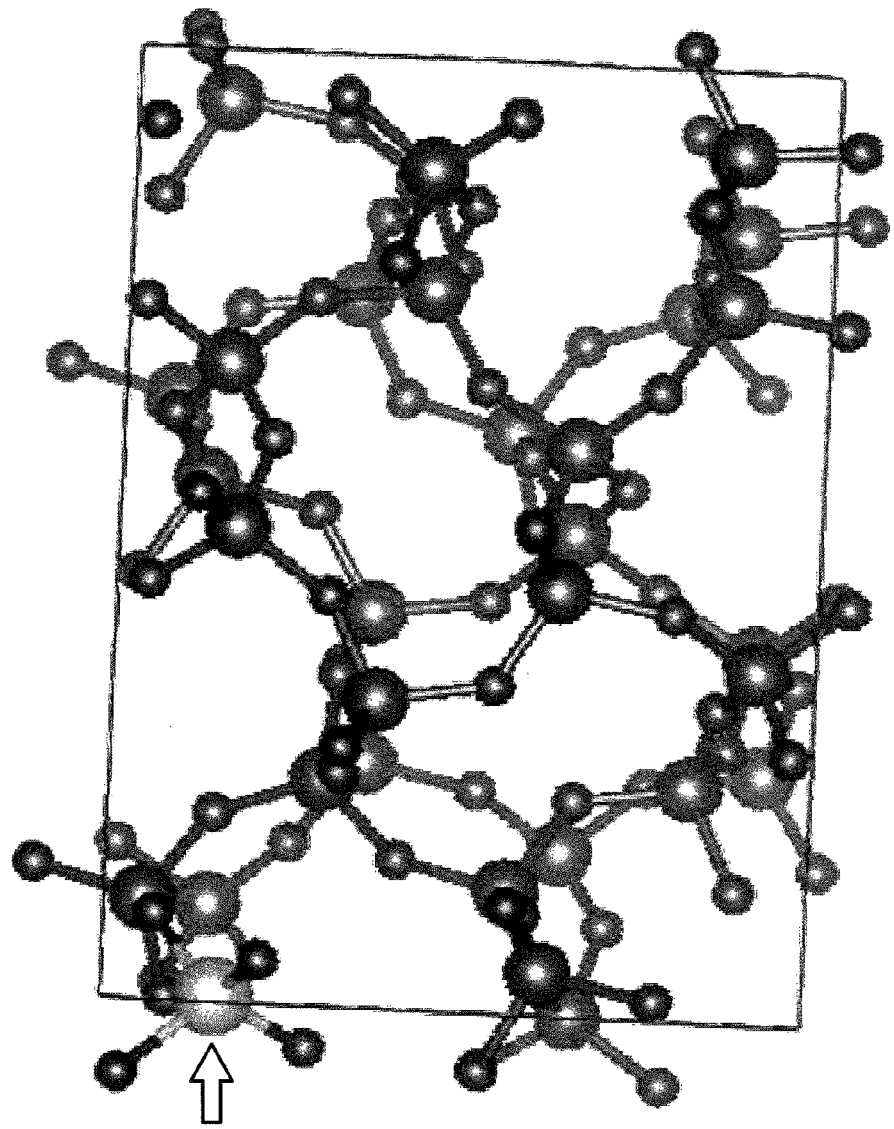
FIG. 8 shows a molecular structure model of silicon oxide used in calculation.

FIG. 8 shows the molecular structure model of $SiO_2$—C, which is different from that of $SiO_2$-A in that any Si atom (indicated by an arrow in FIG. 8) is replaced by an Al (aluminum) atom.

FIG. 9 shows the molecular structure model of $SiO_2$-D, which is different from that of $SiO_2$-A in that any Si atom (indicated by an arrow in FIG. 9) is replaced by a Ga (gallium) atom.

FIG. 10 shows the molecular structure model of $SiO_2$-E, which is different from that of $SiO_2$-A in that any Si atom (indicated by an arrow in FIG. 10) is replaced by a C (carbon) atom.

The first principles calculation process will be described below.

First, crystalline $SiO_2$ with 96 atoms (32 Si atoms and 64 O atoms) is melted at 2500 K and then rapidly cooled at 300 K, whereby $SiO_2$ having the molecular structure shown in FIG. 6 is obtained. The melting time is 20000 steps (1 step=1 femtosecond) and the cooling time is 11000 steps. Then, any Si atom in FIG. 6 is replaced by each atom of B, Al, Ga, and C and structure optimization is performed, so that silicon oxides having the molecular structures shown in FIGS. 7 to 10 are obtained. Here, in the structure optimization, the position of each atom in the molecular structure model is changed by calculation from that in the initial structure so that the energy of the entire molecular structure model has the local minimum value.

Figure 11:
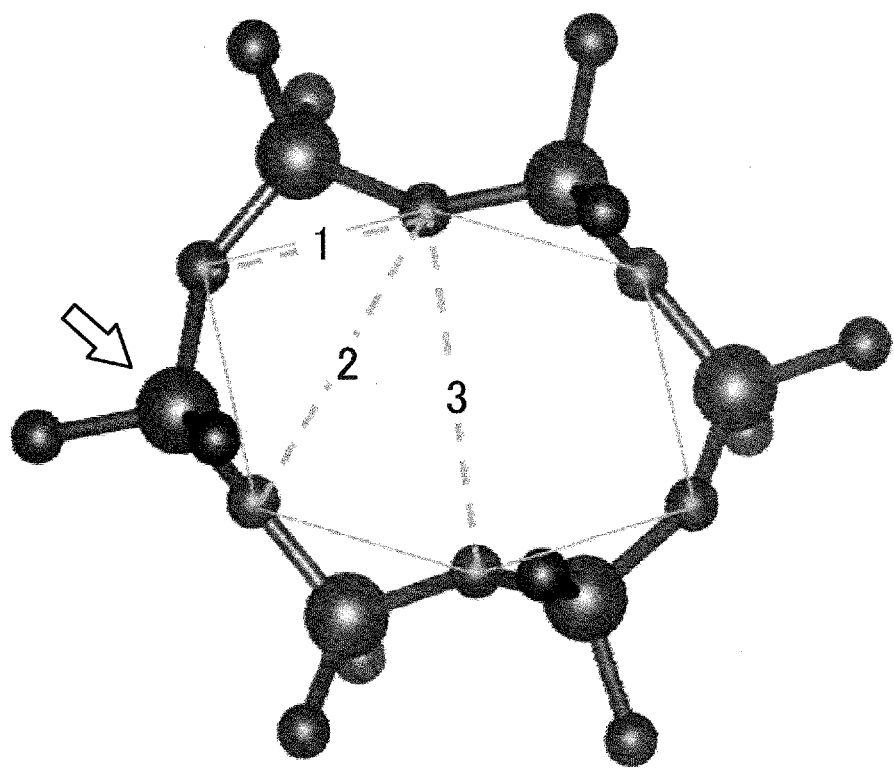
FIG. 11 shows the positions where Li is inserted in calculation.

Then, an Li atom is inserted into $SiO_2$ and silicon oxides shown in FIGS. 6 to 10, and the open-circuit potentials thereof are calculated. Note that the Li atom is assumed to be inserted into positions 1 to 3, each of which is the midpoint between two of six O atoms forming a planar hexagon (the center of each dashed line in FIG. 11). FIG. 11 shows part of the structure model of $SiO_2$-A shown in FIG.

6. In the case where the Si atom indicated by an arrow is replaced by another atom (B, Al, Ga, or C) in FIG. 11, the Li atom is assumed to be inserted into the silicon oxides shown in FIGS. 7 to 10.

Table 1 lists the conditions used in the first principles calculation. Note that the calculation is performed while the number of atoms, the volume, and the temperature of the molecular structure are fixed in melting and cooling.

TABLE 1

| software | VASP |
|---|---|
| model | $SiO_2$ 96 atoms |
| functional | GGA optimized |
| pseudo potential | PAW |
| cut-off energy | 500 eV |
| k point | 1 * 1 * 1 |

Table 2 shows the results of the first principles calculation.

TABLE 2

| molecular structure | position of Li insertion | open-circuit potential |
|---|---|---|
| SiO2-A | 1 | −1.47 |
|  | 2 | −1.71 |
|  | 3 | −1.43 |
| SiO2-B | 1 | 5.35 |
|  | 2 | 5.35 |
|  | 3 | 5.35 |
| SiO2-C | 1 | 5.70 |
|  | 2 | 5.69 |
|  | 3 | 5.70 |
| SiO2-D | 1 | 5.74 |
|  | 2 | 5.74 |
|  | 3 | 5.76 |
| SiO2-E | 1 | −1.53 |
|  | 2 | −1.50 |
|  | 3 | −1.50 |

In the negative electrode active material of the storage battery, the open-circuit potential needs to be higher than or equal to 0 V (vs $Li/Li^+$). When the open-circuit potential is lower than or equal to 0 V (vs $Li/Li^+$), Li or Li metal is likely to be deposited on the surface of the negative electrode active material, causing a short-circuit between the positive and negative electrodes in some cases. In addition, the deposited Li or Li metal might generate irreversible capacity to reduce the capacity of the storage battery.

As shown in Table 2, the silicon oxide $SiO_2$-A has a negative open-circuit potential. That is, in the case where $SiO_2$-A is used as the negative electrode active material, Li is not inserted into the active material, i.e., $SiO_2$ in which an Si atom is not replaced does not function as the negative electrode active material.

In contrast, the silicon oxides $SiO_2$—B, $SiO_2$—C, and $SiO_2$-D each have a positive open-circuit potential. This indicates that the silicon oxide in which an Si atom is replaced by a Group 13 atom, in particular, a B, Al, or Ga atom, could function as the negative electrode active material. Note that the molecular structure models used for calculation in this embodiment have high crystallinity. Thus, the open-circuit potential has a large absolute value because the silicon oxides $SiO_2$—B, $SiO_2$—C, and $SiO_2$-D only partly reflect the structure and state of the silicon oxides in which an Si atom is replaced by a B, Al, or Ga atom.

The silicon oxide $SiO_2$-E has a negative open-circuit potential. This indicates that the silicon oxide in which an Si atom is replaced by a C atom does not function as the negative electrode active material.

The calculation results show that the silicon oxide has a positive open-circuit potential when Si is replaced by an atom having a bond less than that of Si by 1. This is because some of O atoms that have been bonded to Si atoms before replacement have dangling bonds in a silicon oxide molecule and trap Li introduced in the silicon oxide, making the molecular structure stable.

In general, the negative electrode active material preferably has an open-circuit potential closer to 0 V (vs $Li/Li^+$). The electromotive force of the storage battery depends on the difference between the potential at which Li is extracted from the positive electrode and the potential at which Li is inserted into the negative electrode. Therefore, the energy density of the storage battery increases as the open-circuit potential of the negative electrode material is closer to 0 V.

The above calculation results show that the B atom, which has the lowest open-circuit potential in the calculated Group 13 atoms, is particularly preferable as an atom replacing Si in $SiO_2$ used as the negative electrode active material.

From the above results, the silicon oxide in which part of Si is replaced by B, Al, or Ga can be used as the negative electrode active material.

This embodiment can be implemented in appropriate combination with any of the other embodiments.

(Embodiment 3)

In this embodiment, structures of a storage battery using, as a negative electrode active material, the silicon oxide described in Embodiment 1, and examples of electronic devices including the storage battery will be described with reference to FIGS. 12A to 31B.

[Coin-Type Storage Battery]

Figure 12A:
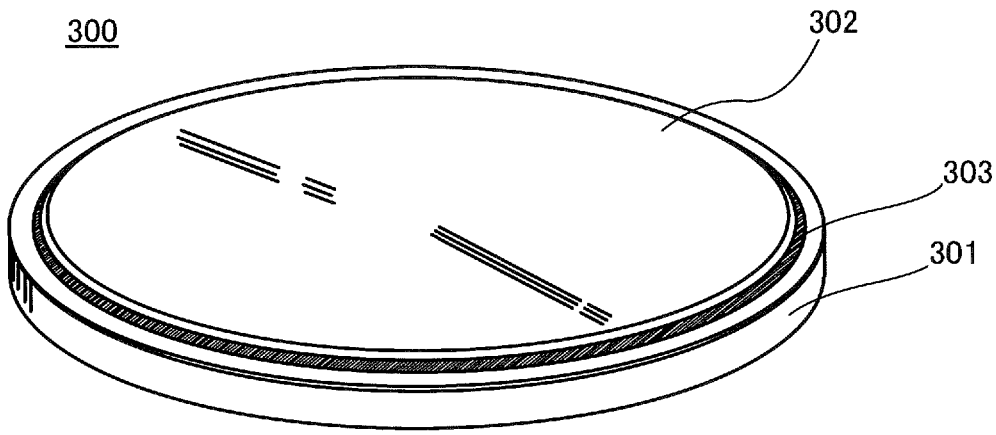
FIGS. 12A to 12C illustrate a coin-type storage battery.
Figure 12B:
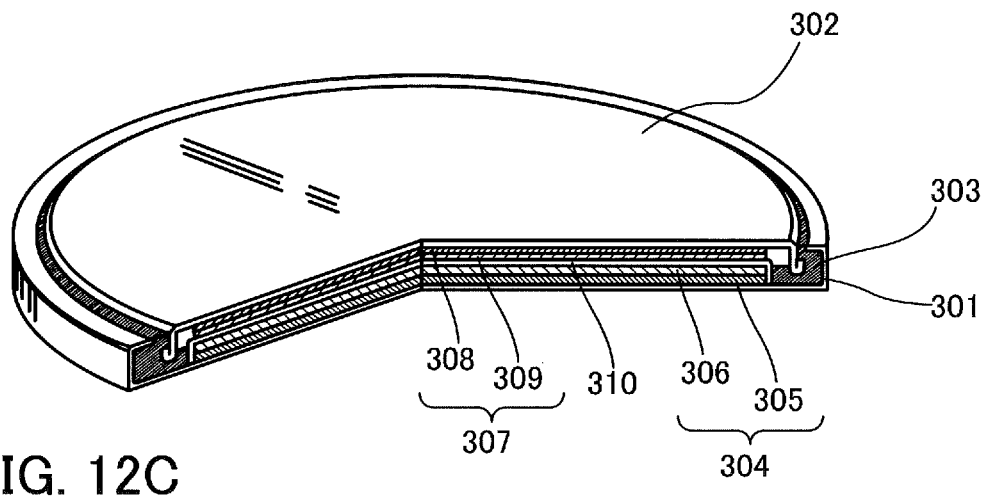

FIG. 12A is an external view of a coin-type (single-layer flat type) storage battery, and FIG. 12B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. The positive electrode active material layer 306 may further include a binder for increasing the adhesion of positive electrode active materials, a conductive additive for increasing the conductivity of the positive electrode active material layer, and the like in addition to the active materials. As the conductive additive, a material that has a large specific surface area is preferably used; for example, acetylene black (AB) can be used. Alternatively, a carbon material such as a carbon nanotube, graphene, or fullerene can be used. A surface of the positive electrode current collector 305 may be covered with an undercoat before the positive electrode active material layer 306 is formed. The undercoat here refers to a film formed over a current collector before applying slurry onto the current collector for the purpose of reducing the interface resistance between the current collector and the positive electrode active material layer 306, i.e., the active material, the conductive additive, or the like or increasing the adhesion between the current collector and the positive electrode active material layer 306, i.e., the active material, the binder, the conductive additive, or the like. Note that the undercoat is not necessarily formed in a film shape, and may be formed in an island shape. For the undercoat, a carbon material can be used, for example.

Examples of the carbon material are graphite, carbon black such as acetylene black or ketjen black (registered mark), and carbon nanotubes. Forming the undercoat over the current collector can reduce the resistance at the interface between the current collector and the positive electrode active material layer 306 formed later, and/or can increase the adhesion between the current collector and the positive electrode active material layer 306. Note that if there is no problem with the adhesion between the current collector and the positive electrode active material layer 306, the electrode strength, and the interface resistance between the current collector and the electrode, it is not necessary to form the undercoat on the current collector.

A negative electrode 307 includes a negative electrode current collector 308 and a negative electrode active material layer 309 provided in contact with the negative electrode current collector 308. The negative electrode active material layer 309 may further include a binder for increasing the adhesion of negative electrode active materials, a conductive additive for increasing the conductivity of the negative electrode active material layer, and the like in addition to the negative electrode active materials. A separator 310 and an electrolyte (not illustrated) are provided between the positive electrode active material layer 306 and the negative electrode active material layer 309. A surface of the negative electrode current collector 308 may be covered with an undercoat before the negative electrode active material layer 309 is formed. The description of the positive electrode 304 is referred to for the undercoat.

Examples of a positive electrode active material used for the positive electrode active material layer 306 include a composite oxide with an olivine crystal structure, a composite oxide with a layered rock-salt crystal structure, and a composite oxide with a spinel crystal structure. As the positive electrode active material, a compound such as $LiFeO_2$, $LiCoO_2$, $LiNiO_2$, $LiMn_2O_4$, $V_2O_5$, $Cr_2O_5$, and $MnO_2$ can be used.

In particular, $LiCoO_2$ is preferable because it has high capacity, and higher stability in the air and higher thermal stability than $LiNiO_2$.

A small amount of lithium nickel oxide ($LiNiO_2$ or $LiNi_{1-x}M_xO_2$ (M=Co, Al, or the like, $0<x<1$)) is preferably added to a lithium-containing material with a spinel crystal structure which contains manganese, such as $LiMn_2O_4$, because the dissolution of manganese and the decomposition of an electrolytic solution can be inhibited.

Alternatively, a complex material ($LiMPO_4$ (general formula: M is one or more of Fe(II), Mn(II), Co(II), and Ni(II))) can be used. Typical examples of the general formula $LiMPO_4$ which can be used as a material are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ ($a+b\le1$, $0<a<1$, and $0<b<1$), $LiFe_cNi_dCo_ePO_4$, $LiFe_cNi_dMn_ePO_4$, $LiNi_cCo_dMn_ePO_4$ ($c+d+e\le1$, $0<c<1$, $0<d<1$, and $0<e<1$), and $LiFe_fNi_gCo_hMn_iPO_4$ ($f+g+h+i\le1$, $0<f<1$, $0<g<1$, $0<h<1$, and $0<i<1$).

$LiFePO_4$ is particularly preferable because it properly has properties necessary for the positive electrode active material, such as safety, stability, high capacity density, high potential, and the existence of lithium ions which can be extracted in initial oxidation (charging).

Alternatively, a complex material such as $Li_{(2-j)}MSiO_4$ (general formula: M is one or more of Fe(II), Mn(II), Co(II), and Ni(II); $0\le j\le 2$) may be used. Typical examples of the general formula $Li_{(2-j)}MSiO_4$ which can be used as a material are lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ ($k+l\le1$, $0<k<1$, and $0<l<1$), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ ($m+n+q\le1$, $0<m<1$, $0<n<1$, and $0<q<1$), and $Li_{(2-j)}Fe_rNi_sCo_tMn_uSiO_4$ ($r+s+t+u\le1$, $0<r<1$, $0<s<1$, $0<t<1$, and $0<u<1$).

Still alternatively, a nasicon compound expressed by $A_xM_2(XO_4)_3$ (general formula: A=Li, Na, or Mg, M=Fe, Mn, Ti, V, Nb, or Al, X=S, P, Mo, W, As, or Si) can be used for the positive electrode active material. Examples of the nasicon compound are $Fe_2(MnO_4)_3$, $Fe_2(SO_4)_3$, and $Li_3Fe_2(PO_4)_3$. Further alternatively, a compound expressed by $Li_2MPO_4F$, $Li_2MP_2O_7$, or $Li_5MO_4$ (general formula: M=Fe or Mn), a perovskite fluoride such as $NaFeF_3$ and $FeF_3$, a metal chalcogenide (a sulfide, a selenide, or a telluride) such as $TiS_2$ and $MoS_2$, an oxide with an inverse spinel crystal structure such as $LiMVO_4$, a vanadium oxide ($V_2O_5$, $V_6O_{13}$, $LiV_3O_8$, or the like), a manganese oxide, an organic sulfur compound, or the like can be used as the positive electrode active material.

In the case where carrier ions are alkali metal ions other than lithium ions, or alkaline-earth metal ions, a material containing an alkali metal (e.g., sodium or potassium) or an alkaline-earth metal (e.g., calcium, strontium, barium, beryllium, or magnesium) instead of lithium may be used as the positive electrode active material. For example, the positive electrode active material may be a layered oxide containing sodium, such as $NaFeO_2$ and $Na_{2/3}[Fe_{1/2}Mn_{1/2}]O_2$.

Further alternatively, any of the aforementioned materials may be combined to be used as the positive electrode active material. For example, a solid solution obtained by combining two or more of the above materials can be used as the positive electrode active material. For example, a solid solution of $LiCo_{1/3}Mn_{1/3}Ni_{1/3}O_2$ and $Li_2MnO_3$ can be used as the positive electrode active material.

Note that although not illustrated, a conductive material such as a carbon layer may be provided on the surface of the positive electrode active material layer 306. The conductive material such as the carbon layer increases the conductivity of the electrode. For example, the positive electrode active material layer 306 can be coated with a carbon layer by mixing a carbohydrate such as glucose at the time of baking the positive electrode active material.

The average diameter of primary particles of the positive electrode active material layer 306 is preferably greater than or equal to 50 nm and less than or equal to 100 μm.

The silicon oxide described in Embodiment 1 can be used for the negative electrode active material layer 309. Specifically, it is possible to use the silicon oxide obtained by replacing part of Si in $SiO_2$ with at least one of boron, aluminum, and gallium.

The positive electrode current collector 305 and the negative electrode current collector 308 can each be formed using a highly conductive material which is not alloyed with a carrier ion of, for example, lithium, such as a metal typified by stainless steel, gold, platinum, zinc, iron, nickel, copper, aluminum, titanium, tantalum, and manganese or an alloy thereof. Alternatively, an aluminum alloy to which an element which improves heat resistance, such as silicon, titanium, neodymium, scandium, and molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, and nickel. The current collectors can each have a foil-like shape, a plate-like shape (sheet-like shape), a net-like shape, a cylindrical shape, a coil shape, a punching-metal shape, an expanded-metal shape, or the like as appropriate. The current collectors each preferably have a thickness of 10 μm to 30 μm inclusive.

As the separator 310, an insulator such as cellulose (paper), polypropylene with pores, and polyethylene with pores can be used.

As an electrolyte of an electrolytic solution, a material which contains carrier ions is used. Typical examples of the electrolyte are lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$. One of these electrolytes may be used alone or two or more of them may be used in an appropriate combination and in an appropriate ratio.

Note that when carrier ions are alkali metal ions other than lithium ions or alkaline-earth metal ions, instead of lithium in the above lithium salts, an alkali metal (e.g., sodium or potassium) or an alkaline-earth metal (e.g., calcium, strontium, barium, beryllium, or magnesium) may be used for the electrolyte.

As a solvent of the electrolytic solution, a material in which carrier ions can move is used; preferably, an aprotic organic solvent is used. Typical examples of the aprotic organic solvent include ethylene carbonate (EC), propylene carbonate, dimethyl carbonate, diethyl carbonate (DEC), γ-butyrolactone, acetonitrile, dimethoxyethane, tetrahydrofuran, and the like, and one or more of these materials can be used. When a gelled high-molecular material is used as the solvent of the electrolyte solution, safety against liquid leakage and the like is improved. Furthermore, a storage battery can be thinner and more lightweight. Typical examples of the gelled high-molecular material include silicone gel, acrylic gel, acrylonitrile gel, a polyethylene oxide-based gel, a polypropylene oxide-based gel, and a gel of a fluorine-based polymer. Alternatively, the use of one or more of ionic liquids (room temperature molten salts) which have features of non-flammability and non-volatility as a solvent of the electrolytic solution can prevent the storage battery from exploding or catching fire even when the storage battery internally shorts out or the internal temperature increases owing to overcharging or the like.

Instead of the electrolytic solution, a solid electrolyte including an inorganic material such as a sulfide-based inorganic material or an oxide-based inorganic material, or a solid electrolyte including a high-molecular material such as a polyethylene oxide (PEO)-based high-molecular material may alternatively be used. When the solid electrolyte is used, a separator or a spacer is not necessary. Further, the battery can be entirely solidified; therefore, there is no possibility of liquid leakage and thus the safety of the battery is dramatically increased.

For the positive electrode can 301 and the negative electrode can 302, a metal having a corrosion-resistant property to an electrolytic solution, such as nickel, aluminum, or titanium, an alloy of such a metal, or an alloy of such a metal and another metal (e.g., stainless steel) can be used. Alternatively, the positive electrode can 301 and the negative electrode can 302 are preferably covered with nickel, aluminum, or the like in order to prevent corrosion due to the electrolytic solution. The positive electrode can 301 and the negative electrode can 302 are electrically connected to the positive electrode 304 and the negative electrode 307, respectively.

The negative electrode 307, the positive electrode 304, and the separator 310 are immersed in the electrolytic solution. Then, as illustrated in FIG. 12B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be manufactured.

Here, a current flow in charging a battery will be described with reference to FIG. 12C. When a battery using lithium is regarded as a closed circuit, lithium ions move and a current flows in the same direction. Note that in the battery using lithium, an anode and a cathode change places in charge and discharge, and an oxidation reaction and a reduction reaction occur on the corresponding sides; hence, an electrode with a high redox potential is called a positive electrode and an electrode with a low redox potential is called a negative electrode. For this reason, in this specification, the positive electrode is referred to as a "positive electrode" and the negative electrode is referred to as a "negative electrode" in all the cases where charge is performed, discharge is performed, a reverse pulse current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the term "anode" or "cathode" is used, it should be mentioned that the anode or the cathode is which of the one at the time of charging or the one at the time of discharging and corresponds to which of a positive electrode or a negative electrode.

Figure 12C:
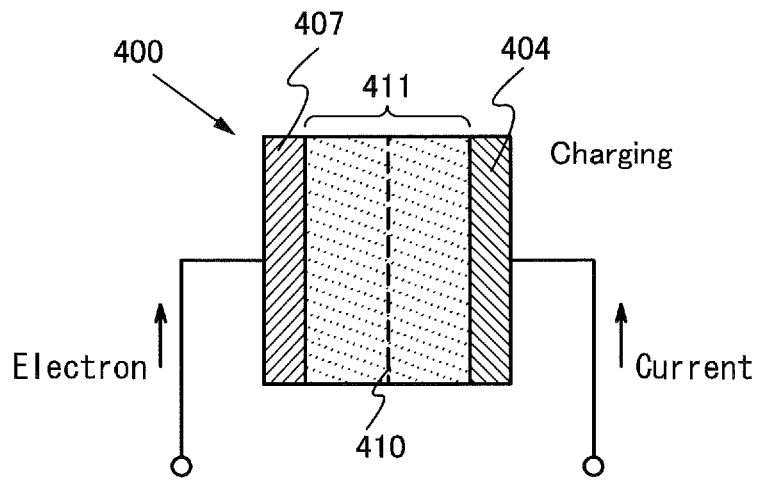

Two terminals in FIG. 12C are connected to a charger, and a storage battery 400 is charged. As the charge of the storage battery 400 proceeds, a potential difference between electrodes increases. The positive direction in FIG. 12C is the direction in which a current flows from one terminal outside the storage battery 400 to a positive electrode 404, flows from the positive electrode 404 to a negative electrode 407 through an electrolyte 411 and a separator 410 in the storage battery 400, and flows from the negative electrode 407 to the other terminal outside the storage battery 400. In other words, a current flows in the direction of a flow of a charging current.

[Cylindrical Storage Battery]

Figure 13A:
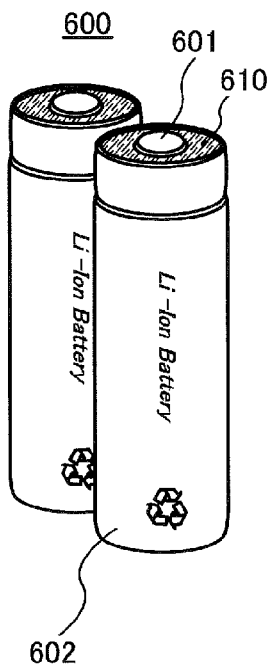
FIGS. 13A and 13B illustrate a cylindrical storage battery.

Next, an example of a cylindrical storage battery will be described with reference to FIGS. 13A and 13B. As illustrated in FIG. 13A, a cylindrical storage battery 600 includes a positive electrode cap (battery cap) 601 on the top surface and a battery can (outer can) 602 on the side surface and bottom surface. The positive electrode cap and the battery can 602 are insulated from each other by a gasket (insulating gasket) 610.

Figure 13B:
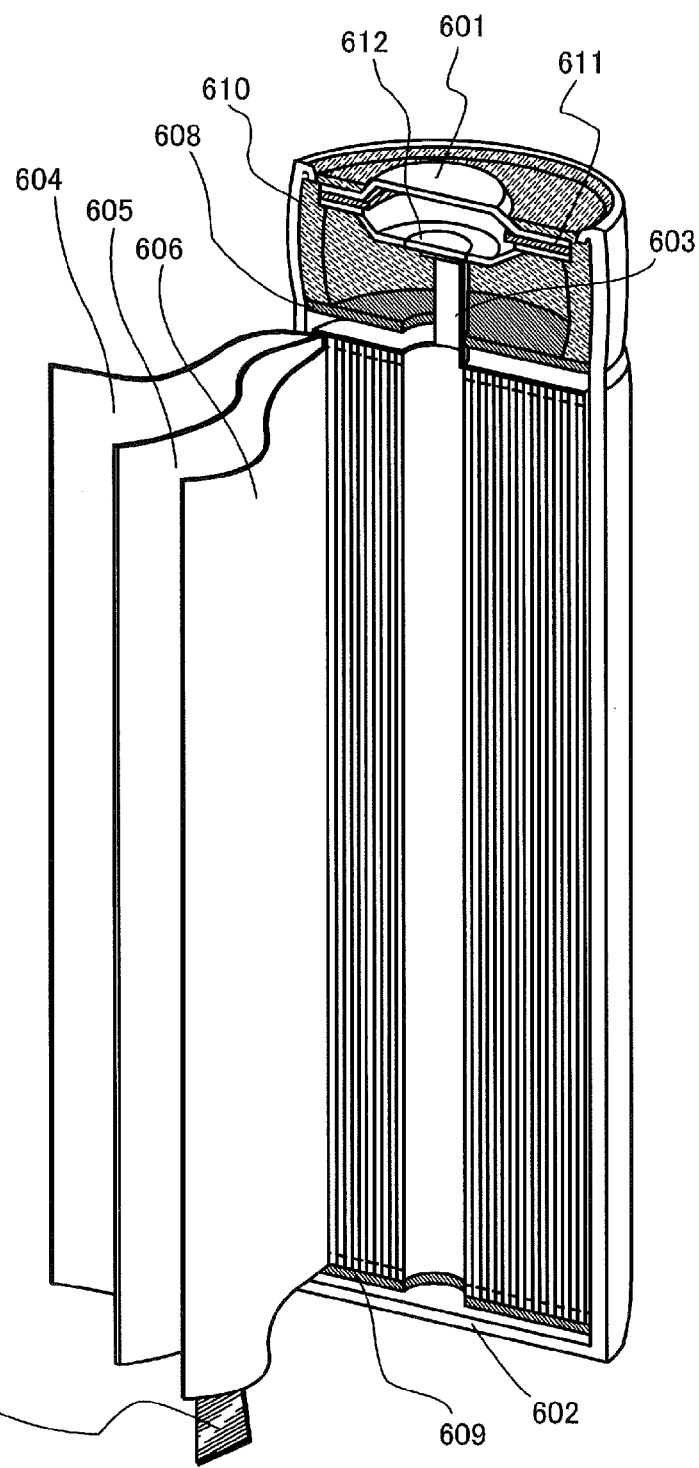

FIG. 13B is a diagram schematically illustrating a cross section of the cylindrical storage battery. Inside the battery can 602 having a hollow cylindrical shape, a battery element in which a strip-like positive electrode 604 and a strip-like negative electrode 606 are wound with a stripe-like separator 605 interposed therebetween is provided. Although not illustrated, the battery element is wound around a center pin. One end of the battery can 602 is closed and the other end thereof is open. For the battery can 602, a metal having a corrosion-resistant property to an electrolytic solution, such as nickel, aluminum, or titanium, an alloy of such a metal, or an alloy of such a metal and another metal (e.g., stainless steel) can be used. Alternatively, the battery can 602 is preferably covered with nickel, aluminum, or the like in order to prevent corrosion due to the electrolytic solution. Inside the battery can 602, the battery element in which the positive electrode, the negative electrode, and the separator are wound is interposed between a pair of insulating plates 608 and 609 which face each other. Further, a nonaqueous electrolytic solution (not illustrated) is injected inside the battery can 602 provided with the battery element. As the nonaqueous electrolytic solution, a nonaqueous electrolytic solution which is similar to that of the above coin-type storage battery can be used.

The positive electrode 604 and the negative electrode 606 can be manufactured in a manner similar to that of the positive electrode and the negative electrode of the coin-type storage battery described above except that active materials are formed on both sides of the current collectors owing to the winding of the positive electrode and the negative electrode of the cylindrical storage battery. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off the electrical connection between the positive electrode cap 601 and the positive electrode 604 when the internal pressure of the battery exceeds a predetermined threshold value. Further, the PTC element 611, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic or the like can be used for the PTC element.

[Thin Storage Battery]

Next, an example of a thin storage battery will be described with reference to FIG. 14. When a flexible thin storage battery is used in an electronic device at least part of which is flexible, the storage battery can be bent as the electronic device is bent.

Figure 14:
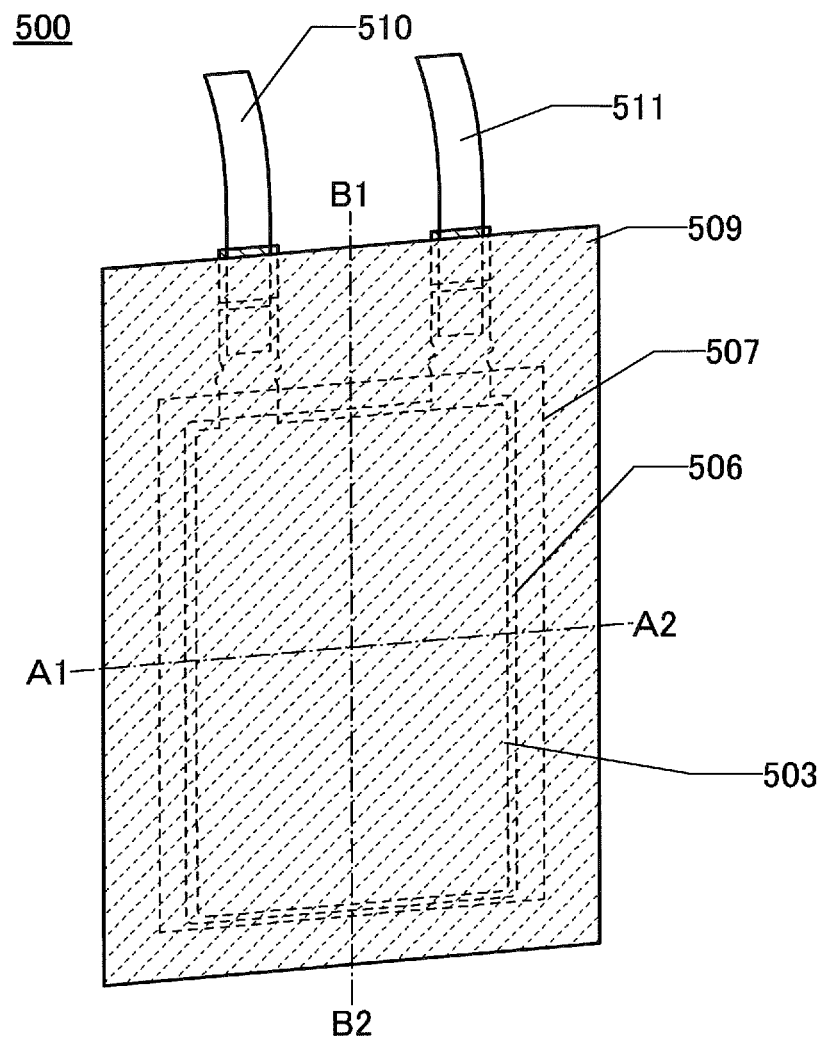
FIG. 14 illustrates a thin storage battery.
Figure 16A:
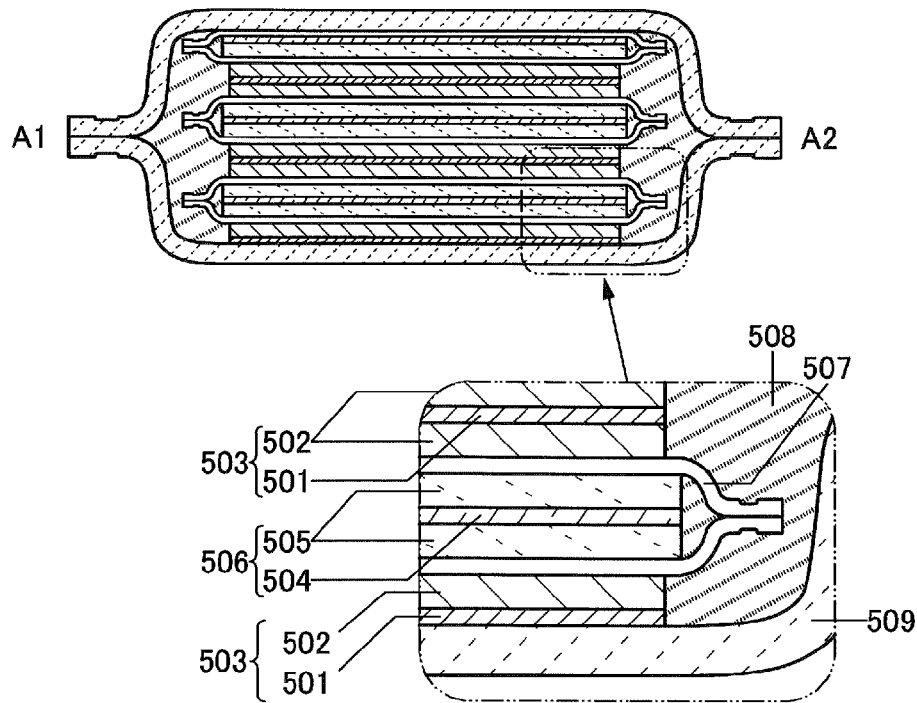
FIGS. 16A and 16B illustrate thin storage batteries.
Figure 16B:
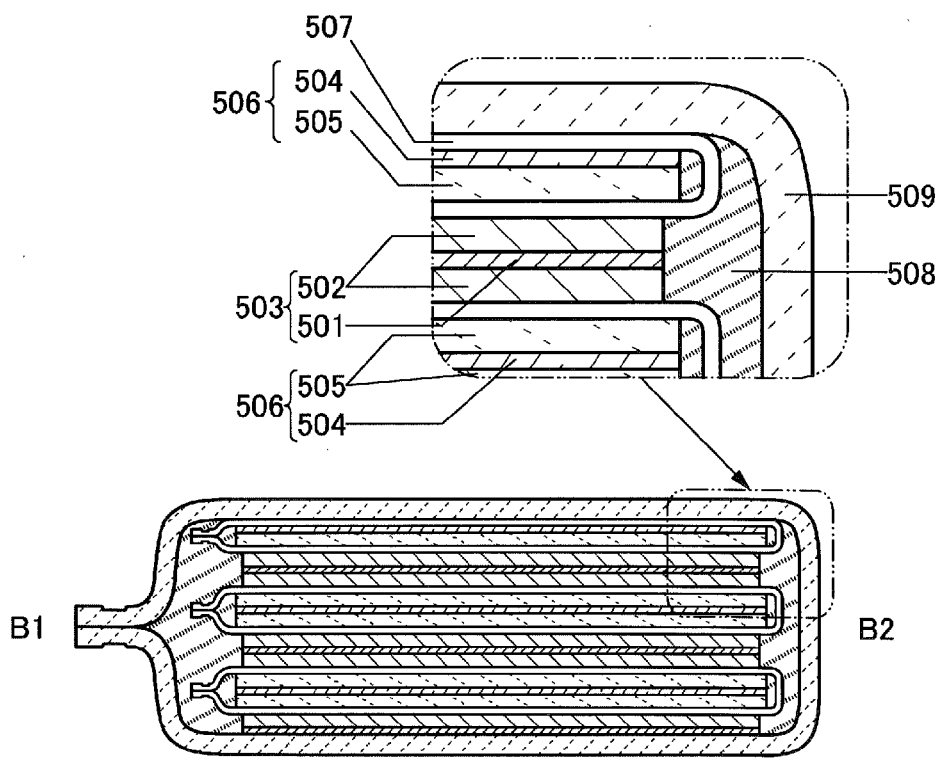

FIG. 14 is an external view of a thin storage battery 500. FIG. 16A is a cross-sectional view along dashed-dotted line A1-A2 in FIG. 14, and FIG. 16B is a cross-sectional view along dashed-dotted line B1-B2 in FIG. 14. The thin storage battery 500 includes a positive electrode 503 including a positive electrode current collector 501 and a positive electrode active material layer 502, a negative electrode 506 including a negative electrode current collector 504 and a negative electrode active material layer 505, a separator 507, an electrolytic solution 508, and an exterior body 509. The separator 507 is provided between the positive electrode 503 and the negative electrode 506 in the exterior body 509. The electrolytic solution 508 is included in the exterior body 509.

The silicon oxide described in Embodiment 1 can be used for the negative electrode active material layer 505. Specifically, it is possible to use the silicon oxide obtained by replacing part of Si in $SiO_2$ with at least one of boron, aluminum, and gallium.

Figure 19A:
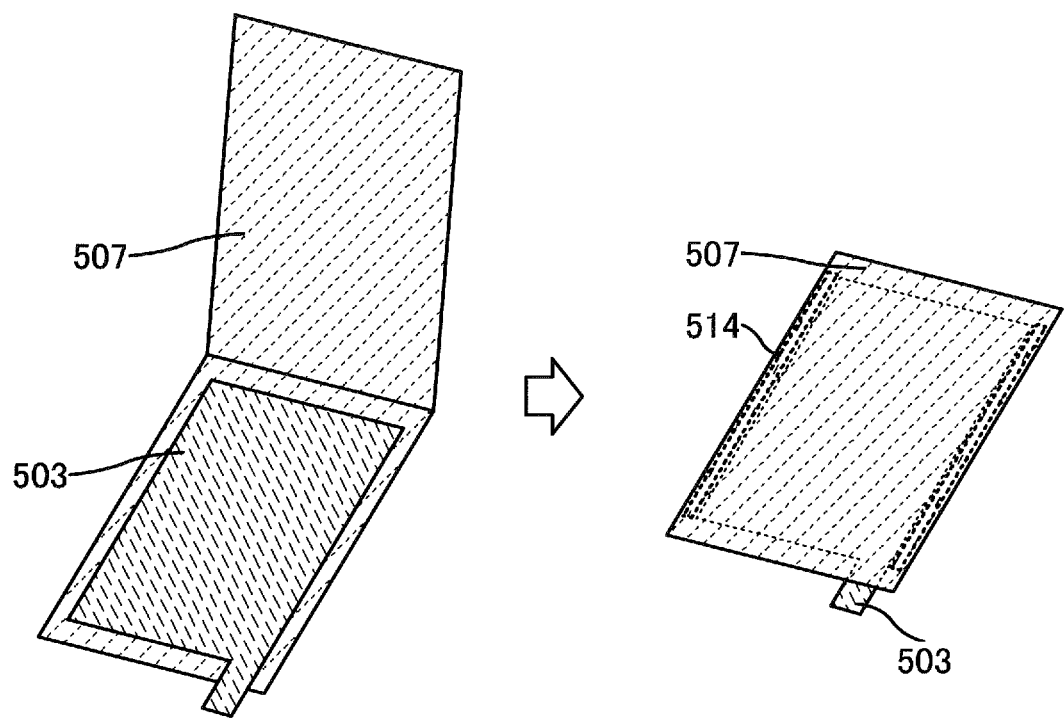
FIGS. 19A and 19B illustrate thin storage batteries.
Figure 19B:
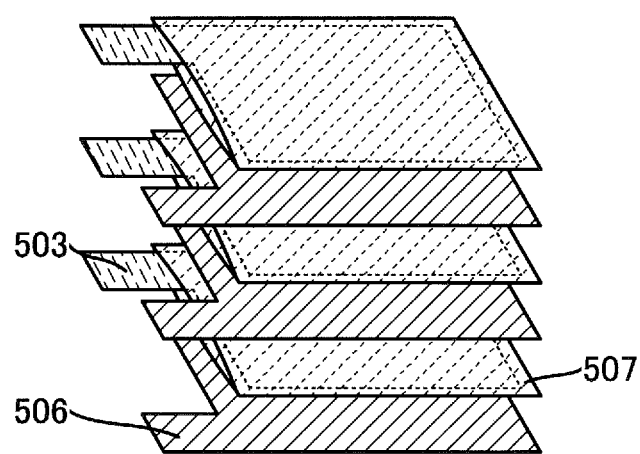

The separator 507 is preferably formed to have a bag-like shape to surround one of the positive electrode 503 and the negative electrode 506. For example, as illustrated in FIG. 19A, the separator 507 is folded in two so that the positive electrode 503 is sandwiched, and sealed with a sealing portion 514 in a region outside the region overlapping with the positive electrode 503; thus, the positive electrode 503 can be reliably supported inside the separator 507. Then, as illustrated in FIG. 19B, the positive electrodes 503 surrounded by the separators 507 and the negative electrodes 506 are alternately stacked and provided in the exterior body 509, whereby the thin storage battery 500 can be formed.

Figure 17:
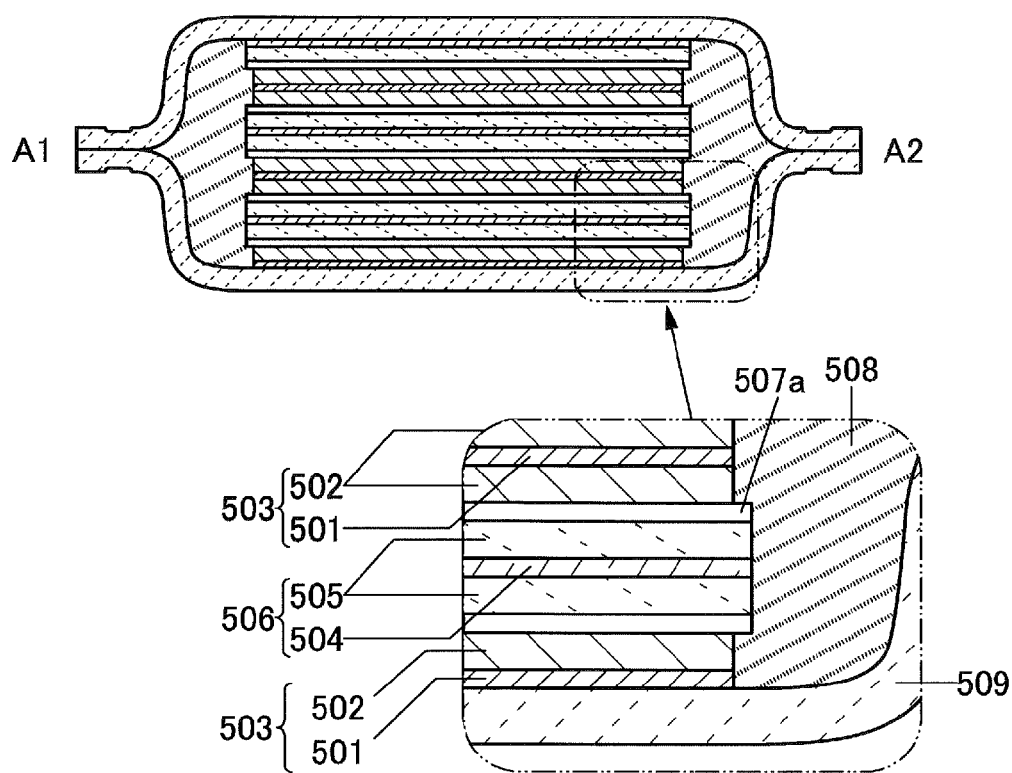
FIG. 17 illustrates a thin storage battery.

Note that the shape of the separator 507 is not limited to the bag-like shape. For example, as illustrated in FIG. 17, a separator 507a that does not have the bag-like shape may be interposed between the positive electrode 503 and the negative electrode 506. In that case, the external shape of the separator 507a may be the same as or larger than that of the negative electrode 506. When the end of the separator 507a is positioned on an outer side than the end of the negative electrode 506, a short-circuit between the positive electrode 503 and the negative electrode 506 can be prevented.

Figure 18A:
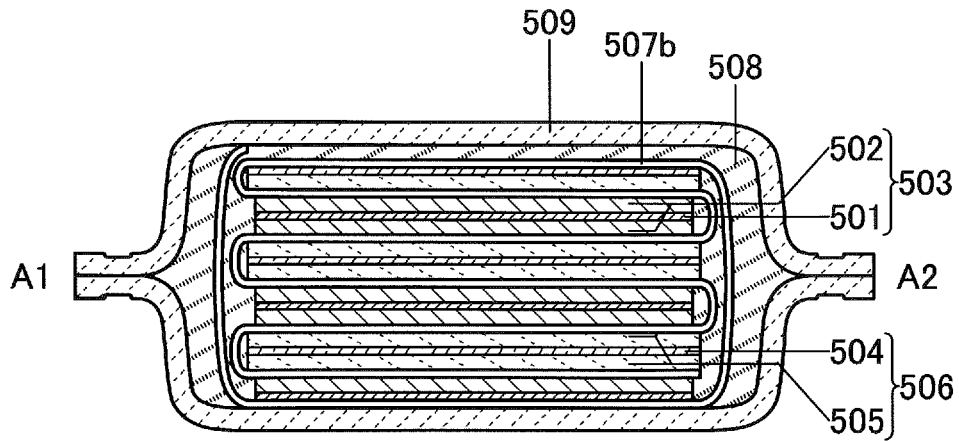
FIGS. 18A to 18C illustrate thin storage batteries.

Alternatively, as illustrated in FIG. 18A, a separator 507b may be bent plural times so as to be interposed between the positive electrode 503 and the adjacent negative electrode 506.

Figure 18B:
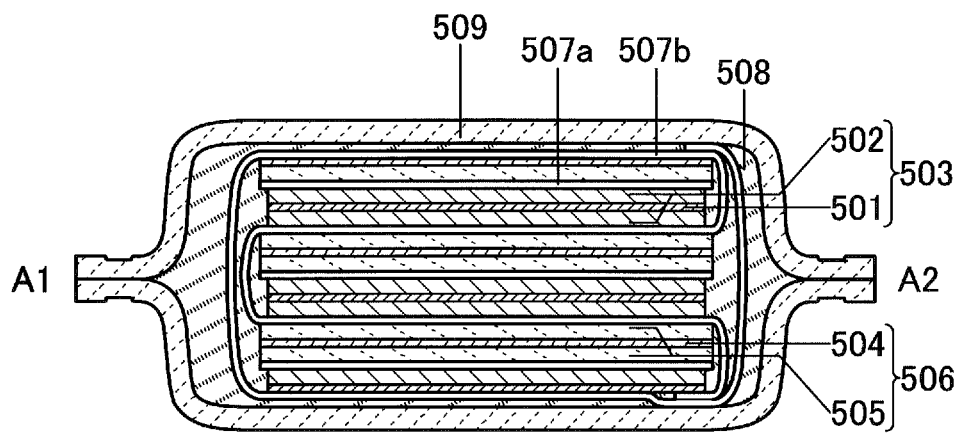

Further alternatively, as illustrated in FIG. 18B, the separator 507b may be bent plural times so as to be interposed between a pair of positive and negative electrodes 503 and 506 and an adjacent pair of positive and negative electrodes 503 and 506, and the separator 507a may be interposed between the positive electrode 503 and the negative electrode 506 in each of the pairs. In that case, the external shape of the separator 507a may be the same as or larger than that of the negative electrode 506. Note that the separator 507b may be wound spirally so as to be interposed between a pair of positive and negative electrodes 503 and 506 and an adjacent pair of positive and negative electrodes 503 and 506 as illustrated in FIG. 18C.

Figure 18C:
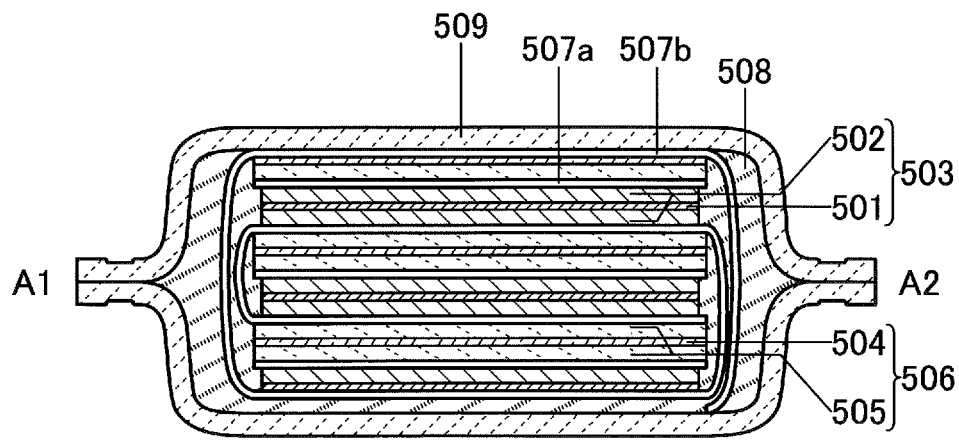

Note that in FIGS. 18A to 18C, the outer edge of the stack of the positive and negative electrodes 503 and 506 (here, three stacks of electrode layers) is preferably covered with the separator 507b. Such a structure allows the stacks to be held surely and prevents a change in the positional relationship between the facing positive and negative electrodes 503 and 506.

Figure 20A:
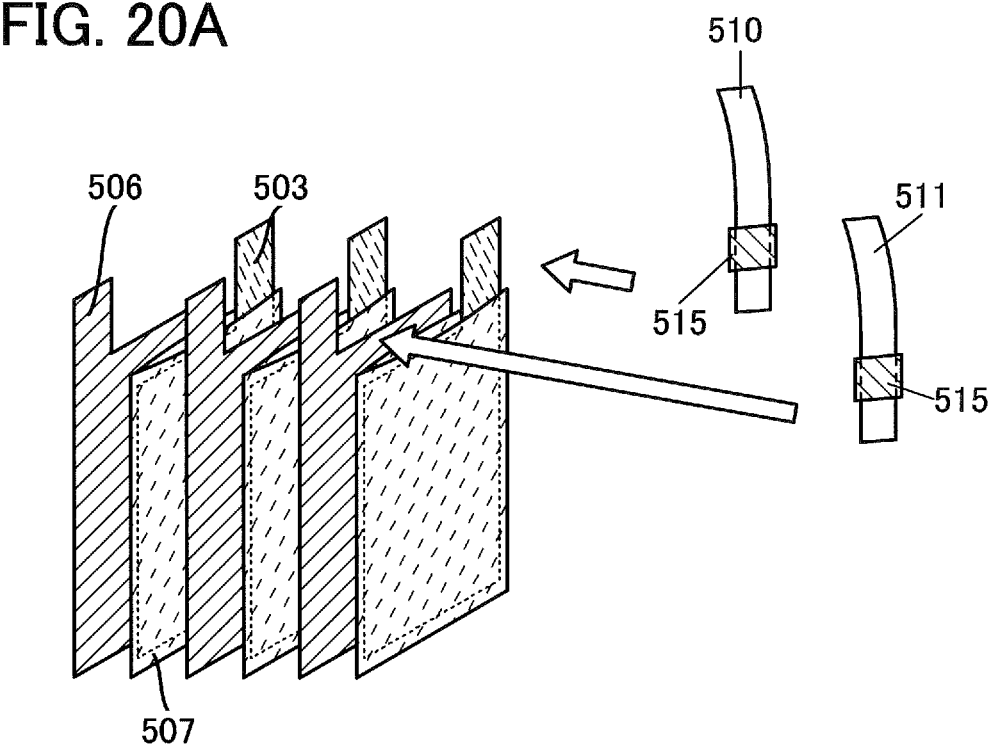
FIGS. 20A and 20B illustrate thin storage batteries.
Figure 20B:
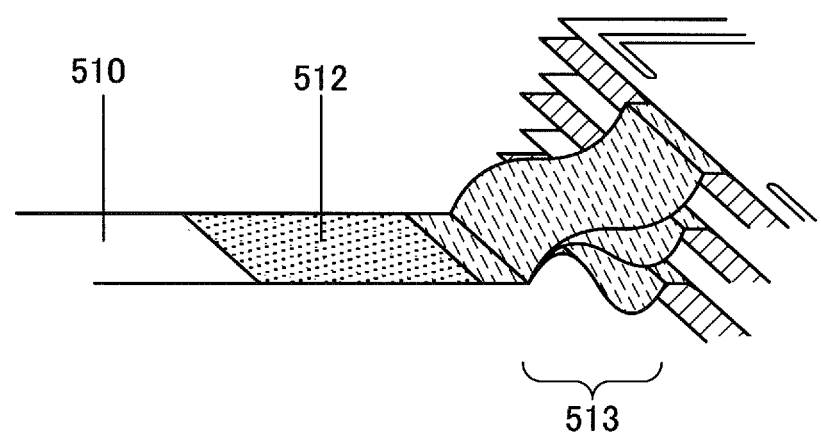

FIGS. 20A and 20B show an example in which a lead electrode is welded to the positive electrode 503 and the negative electrode 506. FIG. 20B shows an example in which a positive electrode lead electrode 510 is welted to the positive electrode current collector 501. The positive electrode current collector 501 is welded to the positive electrode lead electrode 510 in a welding region 512 by ultrasonic welding or the like. When the positive electrode current collector 501 includes a bent portion 513 illustrated in FIG. 20B, stress due to external force applied after the formation of the storage battery 500 can be relieved, improving the reliability of the storage battery 500. A negative electrode lead electrode 511 is also welded to the negative electrode current collector 504. Note that the positive electrode lead electrode 510 and the negative electrode lead electrode 511 each may include a sealant 515 at a position that overlaps with a sealing portion of the exterior body 509 when the stack of the positive electrode 503, the negative electrode 506, and the separator 507 is sealed in the exterior body 509.

Figure 15:
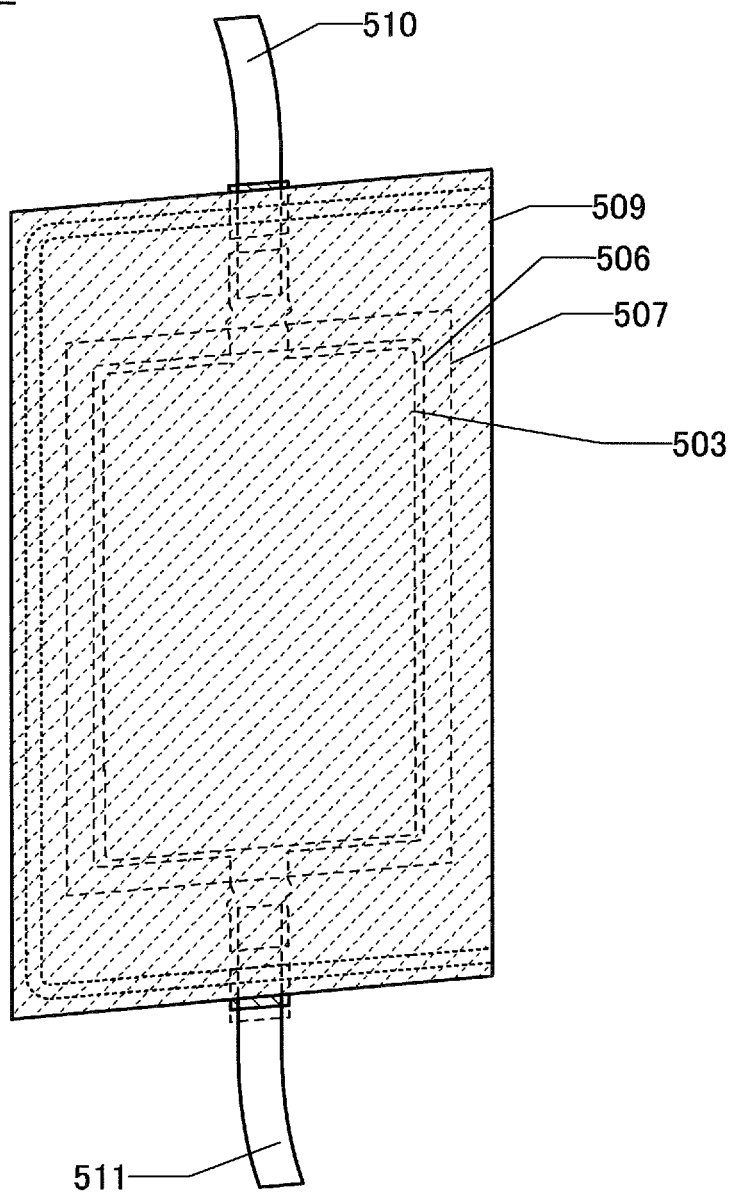
FIG. 15 illustrates a thin storage battery.

In the thin storage battery 500 illustrated in FIGS. 14 and 15, the positive electrode lead electrode 510 and the negative electrode lead electrode 511 are welded to the positive electrode current collector 501 in the positive electrode 503 and the negative electrode current collector 504 in the negative electrode 506, respectively, by ultrasonic welding. The positive electrode current collector 501 and the negative electrode current collector 504 can double as terminals for electrical contact with the outside. In that case, the positive electrode current collector 501 and the negative electrode current collector 504 may be arranged so as to be partly exposed to the outside the exterior body 509 without using lead electrodes.

Although the positive electrode lead electrode 510 and the negative electrode lead electrode 511 are provided on the same side in FIG. 14, they may be provided on different sides as illustrated in FIG. 15. The lead electrodes of the storage battery of one embodiment of the present invention can be freely positioned as described above; therefore, the degree of freedom in design is high. Accordingly, a product including the storage battery of one embodiment of the present invention can have a high degree of freedom in design. Furthermore, the yield of products including the storage battery of one embodiment of the present invention can be increased.

As the exterior body 509 in the thin storage battery 500, for example, a film having the following three-layer structure can be used: a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film.

FIGS. 16A to 18C show an example including 3 electrode layers. It is needless to say that the number of electrode layers is not limited to 3, and may be more than 3 or less than 3. In the case of using a large number of electrode layers, the storage battery can have high capacity. In contrast, in the case of using a small number of electrode layers, the storage battery can have a small thickness and high flexibility.

In the above structure, the exterior body 509 of the storage battery can change its form with a radius of greater than or equal to 30 mm, preferably greater than or equal to 10 mm. One or two films are used as the exterior body of the storage battery. In the case where the storage battery has a layered structure, the storage battery has a cross section sandwiched by two curved surfaces of the films when it is bent.

Figure 21A:
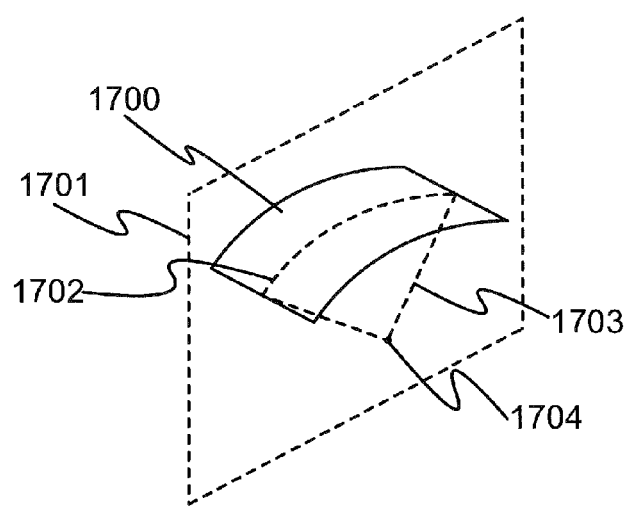
FIGS. 21A to 21C illustrate the curvature radius of a plane.
Figure 21B:
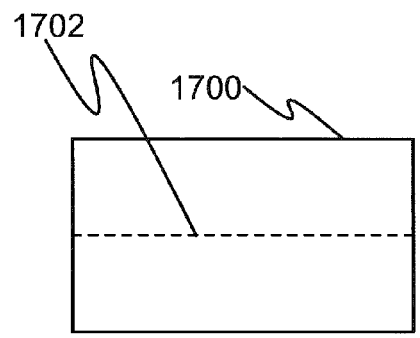
Figure 21C:
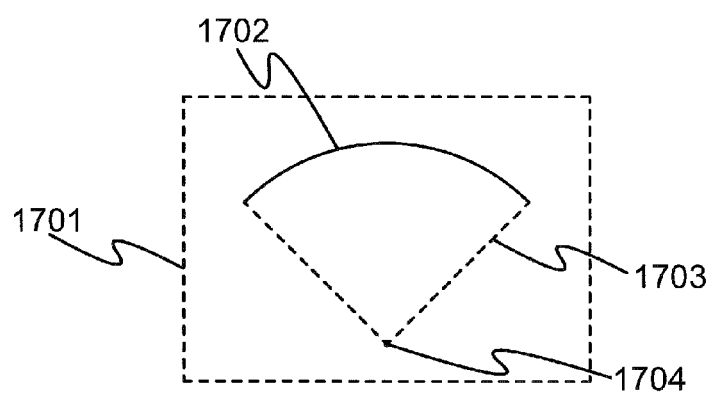

Description is given of the radius of curvature of a surface with reference to FIGS. 21A to 21C. In FIG. 21A, on a plane 1701 along which a curved surface 1700 is cut, part of a curve 1702 of the curved surface 1700 is approximate to an arc of a circle, and the radius of the circle is referred to as a radius of curvature 1703 and the center of the circle is referred to as a center 1704 of curvature. FIG. 21B is a top view of the curved surface 1700. FIG. 21C is a cross-sectional view of the curved surface 1700 taken along the plane 1701. When a curved surface is cut by a plane, the radius of curvature of a curve in a cross section differs depending on the angle between the curved surface and the plane or on the cut position, and the smallest radius of curvature is defined as the radius of curvature of a surface in this specification and the like.

In the case of bending a storage battery in which electrodes, an electrolytic solution, and the like which are denoted by reference numeral 1805 are sandwiched between two films as exterior bodies, a radius of curvature 1802 of a film 1801 close to a center of curvature 1800 of the storage battery is smaller than a radius of curvature 1804 of a film 1803 far from the center of curvature 1800 (FIG. 22A). When the storage battery is curved and has an arc-shaped cross section, compressive stress is applied to a surface of the film on the side closer to the center of curvature 1800 and tensile stress is applied to a surface of the film on the side farther from the center of curvature 1800 (FIG. 22B). However, by forming a pattern including convex portions or concave portions on surfaces of the exterior bodies, the influence of a strain can be reduced to be acceptable even when compressive stress and tensile stress are applied. For this reason, the storage battery can change its form such that the exterior body on the side closer to the center of curvature has a curvature radius greater than or equal to 30 mm, preferably greater than or equal to 10 mm.

Note that the cross-sectional shape of the storage battery is not limited to a simple arc shape, and the cross section can be partly arc-shaped; for example, a shape illustrated in FIG. 22C, a wavy shape illustrated in FIG. 22D, or an S shape can be used. When the curved surface of the storage battery has a shape with a plurality of centers of curvature, the storage battery can change its form such that a curved surface with the smallest radius of curvature among radii of curvature with respect to the plurality of centers of curvature, which is a surface of the exterior body on the side closer to the center of curvature, has a curvature radius greater than or equal to 30 mm, preferably greater than or equal to 10 mm.

Note that in this embodiment, the coin-type storage battery, the cylindrical storage battery, and the thin storage battery are given as examples of the storage battery; however, any of storage batteries with a variety of shapes, such as a sealed storage battery and a rectangular storage battery, can be used. Further, a structure in which a plurality of positive electrodes, a plurality of negative electrodes, and a plurality of separators are stacked or rolled may be employed.

For each of the negative electrodes of the storage batteries 300, 500, and 600, which are described in this embodiment, the negative electrode active layer of one embodiment of the present invention is used. Thus, the discharge capacity of the storage batteries 300, 500, and 600 can be increased, and the manufacturing costs of these storage batteries can be reduced.

[Rectangular Storage Battery]

Figure 23A:
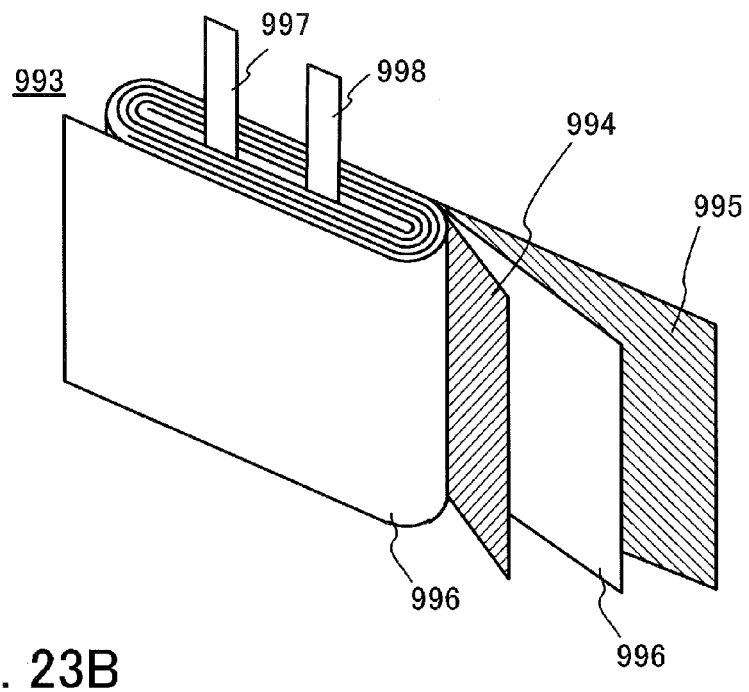
FIGS. 23A to 23C illustrate examples of a power storage device.
Figure 23B:
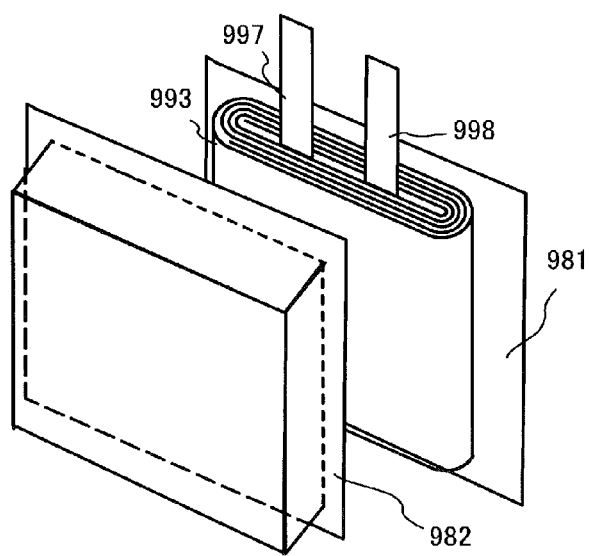
Figure 23C:
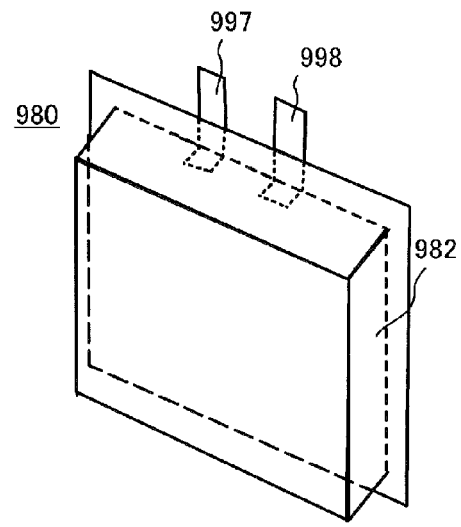

The thin storage battery is not limited to the one illustrated in FIG. 14. Another example of a thin storage battery is illustrated in FIGS. 23A to 23C. A wound body 993 illustrated in FIG. 23A includes a negative electrode 994, a positive electrode 995, and a separator 996.

The wound body 993 is obtained by winding a stack in which the negative electrode 994 overlaps with the positive electrode 995 with the separator 996 therebetween. The wound body 993 is covered with a rectangular sealed container or the like; thus, a rectangular storage battery is fabricated.

Note that the number of stacks each including the negative electrode 994, the positive electrode 995, and the separator 996 is determined as appropriate depending on the capacity and element volume which are required. The negative electrode 994 is connected to a negative electrode current collector (not illustrated) via one of a lead electrode 997 and a lead electrode 998. The positive electrode 995 is connected to a positive electrode current collector (not illustrated) via the other of the lead electrode 997 and the lead electrode 998.

In a rectangular power storage device 980 illustrated in FIGS. 23B and 23C, the wound body 993 is packed in a space formed by bonding a film 981 which is an exterior body and a film 982 having a depressed portion by thermo-compression bonding or the like. The wound body 993 includes the lead electrode 997 and the lead electrode 998, and is soaked in an electrolytic solution inside a space surrounded by the film 981 and the film 982 having a depressed portion.

For the film 981 and the film 982 having a depressed portion, a metal material such as aluminum or a resin material can be used, for example. With the use of a resin material for the film 981 and the film 982 having a depressed portion, the film 981 and the film 982 having a depressed portion can be changed in their forms when external force is applied; thus, a flexible storage battery can be fabricated.

Although FIGS. 23B and 23C illustrate an example where a space is formed by two films, the wound body 993 may be placed in a space formed by bending one film.

Furthermore, a flexible power storage device can be fabricated when a resin material or the like is used for an exterior body and a sealed container of the power storage device. Note that in the case where a resin material is used for the exterior body and the sealed container, a conductive material is used for a portion connected to the outside.

For example, FIGS. 24A to 24C illustrate another example of a flexible thin storage battery. The wound body 993 illustrated in FIG. 24A is the same as that illustrated in FIG. 23A, and the detailed description thereof is omitted.

In a rectangular power storage device 990 illustrated in FIGS. 24B and 24C, the wound body 993 is packed in an exterior body 991. The wound body 993 includes the lead electrode 997 and the lead electrode 998, and is soaked in an electrolytic solution inside a space surrounded by the exterior body 991 and an exterior body 992. For example, a metal material such as aluminum or a resin material can be used for the exterior bodies 991 and 992. With the use of a resin material for the exterior bodies 991 and 992, the exterior bodies 991 and 992 can be changed in their forms when external force is applied; thus, a flexible thin storage battery can be fabricated.

[Power Storage System]

Structure examples of power storage systems will be described with reference to FIGS. 25A and 25B, FIGS. 26A1, 26A2, 26B1, and 26B2, and FIGS. 27A and 27B.

Figure 25A:
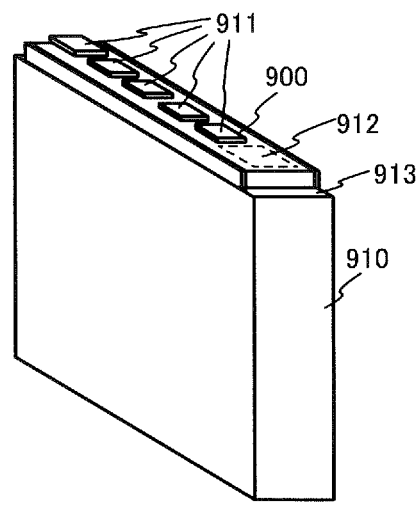
FIGS. 25A and 25B illustrate examples of a power storage device.
Figure 25B:
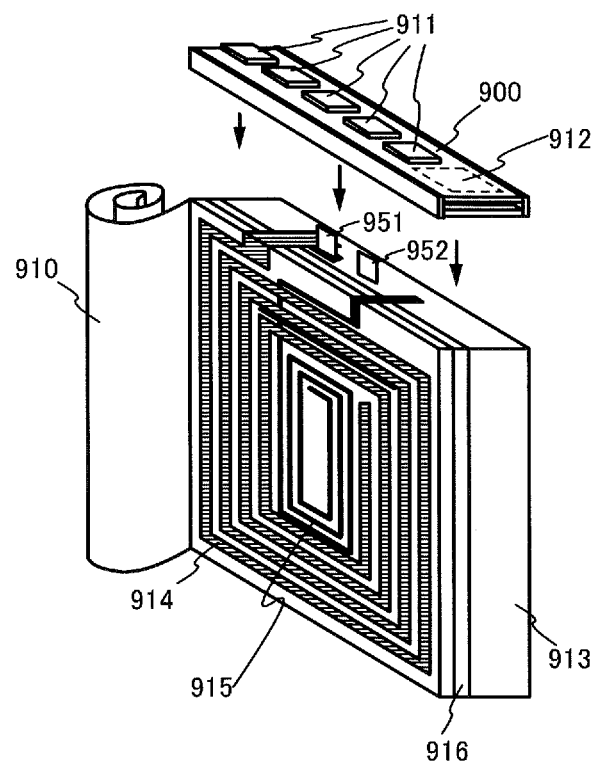

FIGS. 25A and 25B are external views of a power storage system. The power storage system includes a circuit board 900 and a power storage unit 913. A label 910 is attached to the power storage unit 913. As shown in FIG. 25B, the power storage system includes a terminal 951, a terminal 952, an antenna 914, and an antenna 915.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

The circuit 912 may be provided on the rear surface (the surface facing the power storage unit 913) of the circuit board 900. The shape of each of the antennas 914 and 915 is not limited to a coil shape and may be, for example, a linear shape or a plate shape. Furthermore, a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The power storage system includes a layer 916 between the storage battery 913 and the antennas 914 and 915. The layer 916 is configured to, for example, block an electromagnetic field from the power storage unit 913. As the layer 916, for example, a magnetic body can be used.

Note that the structure of the power storage system is not limited to that illustrated in FIGS. 25A and 25B.

For example, as shown in FIGS. 26A1 and 26A2, two opposite surfaces of the power storage unit 913 in FIGS. 25A and 25B may be provided with respective antennas. FIG. 26A1 is an external view showing one side of the opposite surfaces, and FIG. 26A2 is an external view showing the other side of the opposite surfaces. For portions similar to those in FIGS. 25A and 25B, the description of the power storage system illustrated in FIGS. 25A and 25B can be referred to as appropriate.

As illustrated in FIG. 26A1, the antenna 914 is provided on one of the opposite sides of the power storage unit 913 with the layer 916 provided therebetween, and as illustrated in FIG. 26A2, the antenna 915 is provided on the other of the opposite sides of the power storage unit 913 with the layer 917 provided therebetween. The layer 917 is configured to, for example, block an electromagnetic field from the power storage unit 913. As the layer 917, for example, a magnetic body can be used.

With the above structure, both of the antennas 914 and 915 can be increased in size.

Alternatively, as illustrated in FIGS. 26B1 and 26B2, two opposite sides of the power storage unit 913 in FIGS. 25A and 25B may be provided with different types of antennas. FIG. 26B 1 is an external view showing one of the opposite sides, and FIG. 26B2 is an external view showing the other of the opposite sides. Note that for the same portions as the power storage system in FIGS. 25A and 25B, description on the power storage system in FIGS. 25A and 25B can be referred to as appropriate.

As illustrated in FIG. 26B1, the antennas 914 and 915 are provided on one of the opposite sides of the power storage unit 913 with the layer 916 provided therebetween, and as illustrated in FIG. 26B2, an antenna 918 is provided on the other of the opposite sides of the power storage unit 913 with the layer 917 provided therebetween. The antenna 918 is configured to, for example, perform data communication with an external device. An antenna with a shape that can be applied to the antennas 914 and 915 can be used as the antenna 918, for example. An example of a method for communication between the power storage system and another device via the antenna 918 includes a response method such as NFC.

Figure 27A:
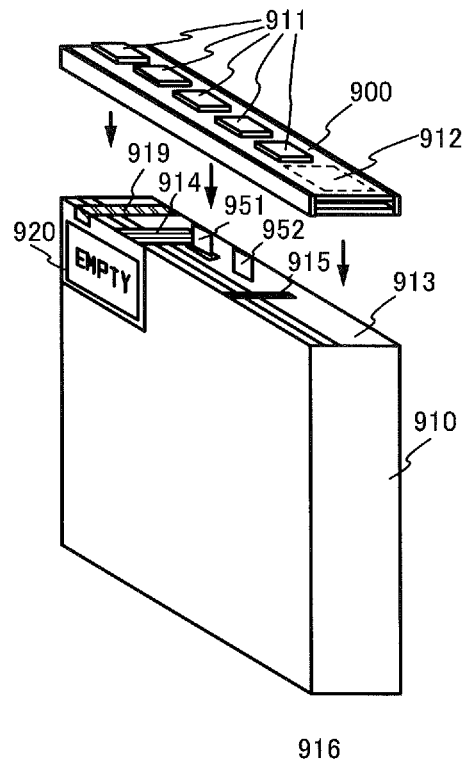
FIGS. 27A and 27B illustrate examples of a power storage device.

Alternatively, as illustrated in FIG. 27A, the power storage unit 913 in FIGS. 25A and 25B may be provided with a display device 920. The display device 920 is electrically connected to the terminal 911 via a terminal 919. It is possible that the label 910 is not provided in a portion where the display device 920 is provided. Note that for the same portions as the power storage system in FIGS. 25A and 25B, description on the power storage system in FIGS. 25A and 25B can be referred to as appropriate.

The display device 920 can display, for example, an image showing whether charging is being carried out or an image showing the amount of stored power. As the display device 920, electronic paper, a liquid crystal display device, an electroluminescent (EL) display device, or the like can be used. For example, the power consumption of the display device 920 can be reduced when electronic paper is used.

Figure 27B:
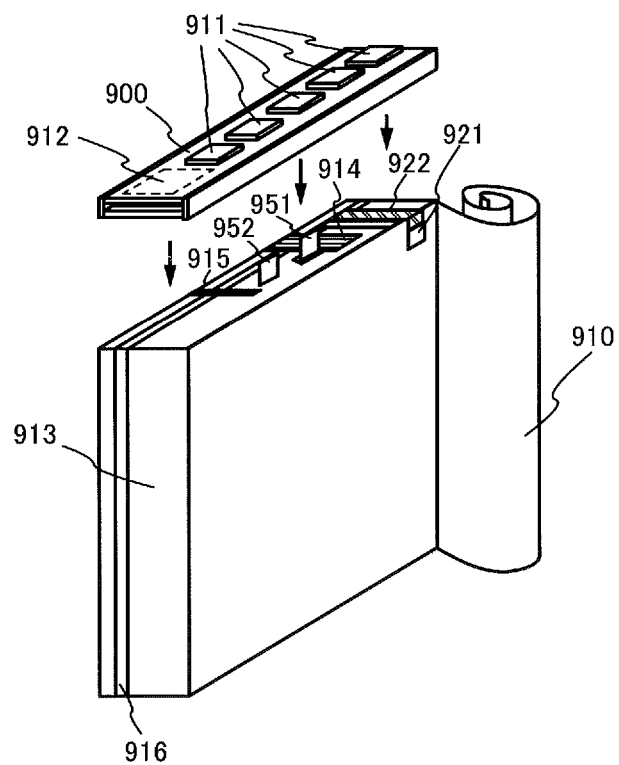

Alternatively, as illustrated in FIG. 27B, the power storage unit 913 in FIGS. 25A and 25B may be provided with a sensor 921. The sensor 921 is electrically connected to the terminal 911 via a terminal 922. Note that for the same portions as the power storage system in FIGS. 25A and 25B, description on the power storage system in FIGS. 25A and 25B can be referred to as appropriate.

As the sensor 921, a sensor that is configured to measure, for example, force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays can be used. With the sensor 921, for example, data on the environment (e.g., temperature) where the power storage system is placed can be acquired and stored in a memory in the circuit 912.

[Electronic Device]

FIGS. 28A to 28G illustrate examples of electronic devices including the flexible storage batteries shown in FIG. 14, FIGS. 23A to 23C, and FIGS. 24A to 24C. Examples of electronic devices each including a flexible power storage device include television devices (also referred to as televisions or television receivers), monitors of computers or the like, cameras such as digital cameras and digital video cameras, digital photo frames, mobile phone sets (also referred to as mobile phones or mobile phone devices), portable game machines, portable information terminals, audio reproducing devices, and large game machines such as pachinko machines.

In addition, a flexible power storage device can be incorporated along a curved inside/outside wall surface of a house or a building or a curved interior/exterior surface of a car.

Figure 28A:
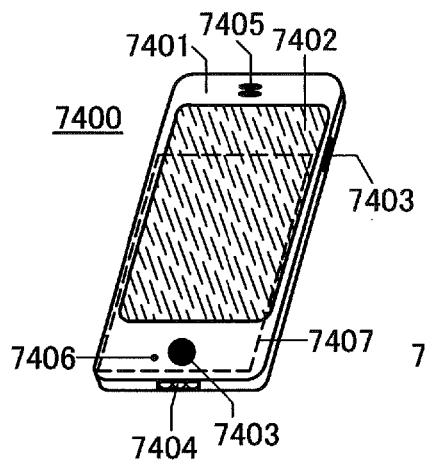
FIGS. 28A to 28G illustrate examples of electronic devices.

FIG. 28A illustrates an example of a mobile phone. A mobile phone 7400 includes a display portion 7402 incorporated in a housing 7401. The mobile phone 7400 further includes operation buttons 7403, an external connection port 7404, a speaker 7405, a microphone 7406, and the like. The mobile phone 7400 includes a power storage device 7407.

Figure 28B:
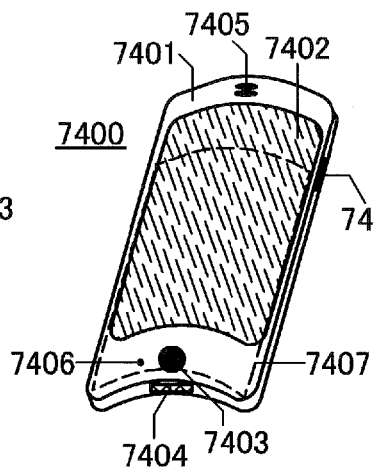
Figure 28C:
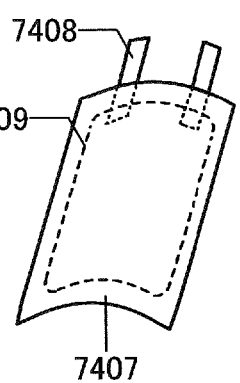

FIG. 28B illustrates the mobile phone 7400 that is bent. When the whole mobile phone 7400 is bent by the external force, the power storage device 7407 included in the mobile phone 7400 is also bent. FIG. 28C illustrates the bent power storage device 7407. The power storage device 7407 is a laminated storage battery. The power storage device 7407 is fixed in a state of being bent. Note that the power storage device 7407 includes a lead electrode 7408 electrically connected to a current collector 7409. The current collector 7409 is, for example, copper foil, and is partly alloyed with gallium to improve the adhesion between the current collector 7409 and an active material layer in contact with the current collector 7409; as a result, the power storage device 7407 have high reliability even in a state of being bent.

Figure 28D:
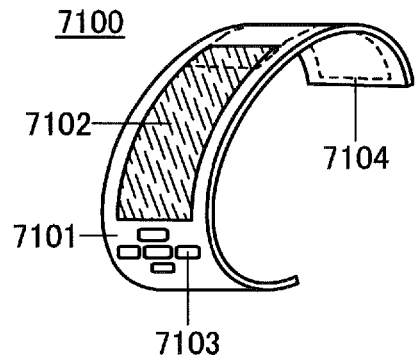
Figure 28E:
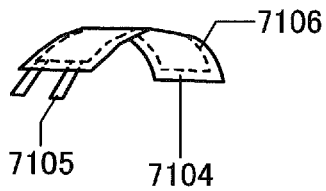

FIG. 28D illustrates an example of a bangle-type display device. A portable display device 7100 includes a housing 7101, a display portion 7102, an operation button 7103, and a power storage device 7104. FIG. 28E illustrates the power storage device 7104 which is bent. When a user wears the power storage device 7104 in a state of being bent on the wrist, a housing of the power storage device 7104 is deformed and the curvature thereof is partly or entirely changed. Note that the radius of curvature of a curve at a point refers to the radius of the circular arc that best approximates the curve at that point. The reciprocal of the radius of curvature is curvature. Specifically, a part or the whole of the housing or the main surface of the power storage device 7104 is changed in the range of radius of curvature from 40 mm to 150 mm. When the radius of curvature at the main surface of the power storage device 7104 is greater than or equal to 40 mm and less than or equal to 150 mm, the reliability can be kept high. Note that the power storage device 7104 includes a lead electrode 7105 electrically connected to a current collector 7106. The current collector 7106 is, for example, a copper foil, and partly alloyed with gallium; thus, adhesion between the current collector 7106 and an active material layer in contact with the current collector 7106 is improved and the power storage device 7104 can have high reliability even when the power storage device 7104 is bent and its curvature is changed many times.

Figure 28F:
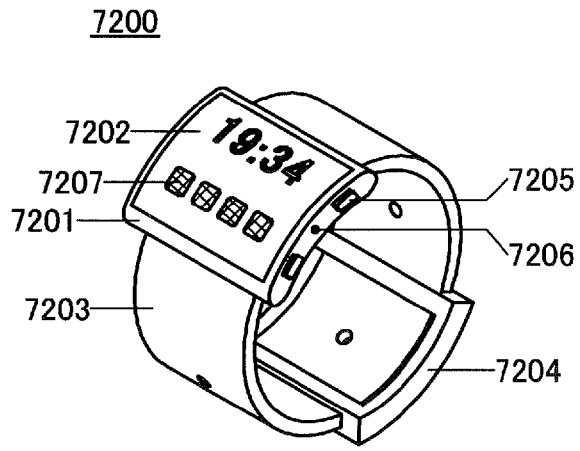
Figure 28G:
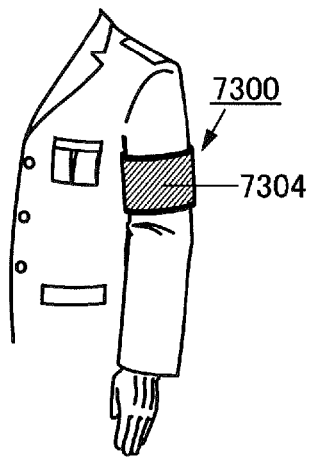

FIG. 28F illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, on/off of the power, on/off of wireless communication, setting and cancellation of a silent mode, and setting and cancellation of a power saving mode can be performed. For example, the functions of the operation button 7205 can be set freely by setting the operating system incorporated in the portable information terminal 7200.

The portable information terminal 7200 can employ near field communication that is a communication method based on an existing communication standard. In that case, for example, mutual communication between the portable information terminal 7200 and a headset capable of wireless communication can be performed, and thus hands-free calling is possible.

Moreover, the portable information terminal 7200 includes the input output terminal 7206, and data can be directly transmitted to and received from another information terminal via a connector. In addition, charging via the input output terminal 7206 is possible. Note that the charging operation may be performed by wireless power feeding without using the input output terminal 7206.

The display portion 7202 of the portable information terminal 7200 is provided with the power storage device of one embodiment of the present invention. For example, the power storage device 7104 illustrated in FIG. 28E that is in the state of being curved can be provided in the housing 7201. Alternatively, the power storage device 7104 illustrated in FIG. 28E can be provided in the band 7203 such that it can be curved.

FIG. 28F illustrates an example of an armband display device. A display device 7300 includes a display portion 7304 and the power storage device of one embodiment of the present invention. The display device 7300 can include a touch sensor in the display portion 7304 and can serve as a portable information terminal.

The display surface of the display portion 7304 is bent, and images can be displayed on the bent display surface. A display state of the display device 7300 can be changed by, for example, near field communication, which is a communication method based on an existing communication standard.

The display device 7300 includes an input output terminal, and data can be directly transmitted to and received from another information terminal via a connector. In addition, charging via the input output terminal is possible. Note that the charging operation may be performed by wireless power feeding without using the input output terminal.

Figure 29A:
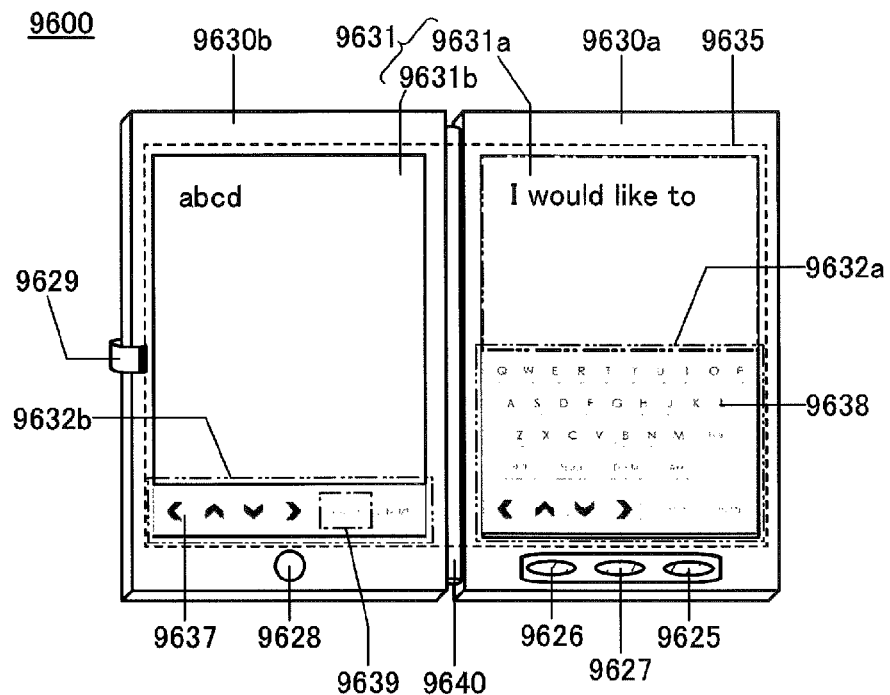
FIGS. 29A to 29C illustrate examples of electronic devices.
Figure 29B:
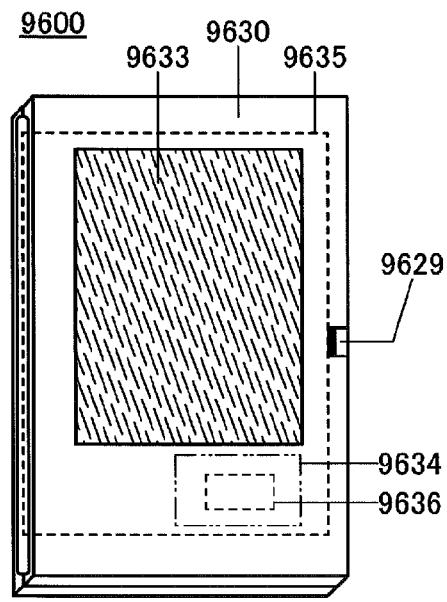

FIGS. 29A and 29B illustrate an example of a tablet terminal that can be folded in half. A tablet terminal 9600 illustrated in FIGS. 29A and 29B includes a housing 9630a, a housing 9630b, a movable portion 9640 connecting the housings 9630a and 9630b, a display portion 9631 including a display portion 9631a and a display portion 9631b, a display mode changing switch 9626, a power switch 9627, a power saving mode changing switch 9625, a fastener 9629, and an operation switch 9628. FIG. 29A illustrates the tablet terminal 9600 that is opened, and FIG. 29B illustrates the tablet terminal 9600 that is closed.

The tablet terminal 9600 includes a power storage unit 9635 inside the housings 9630a and 9630b. The power storage unit 9635 is provided across the housings 9630a and 9630b, passing through the movable portion 9640.

Part of the display portion 9631a can be a touch panel region 9632a, and data can be input by touching operation keys 9638 that are displayed. Note that the figure shows, as an example, that half of the area of the display portion 9631a has only a display function and the other half of the area has a touch panel function. However, the structure of the display portion 9631a is not limited to this, and all the area of the display portion 9631a may have a touch panel function. For example, all the area of the display portion 9631a can display a keyboard and serve as a touch panel while the display portion 9631b can be used as a display screen.

As in the display portion 9631a, part of the display portion 9631b can be a touch panel region 9632b. When a keyboard display switching button 9639 displayed on the touch panel is touched with a finger, a stylus, or the like, a keyboard can be displayed on the display portion 9631b.

Touch input can be performed in the touch panel region 9632a and the touch panel region 9632b at the same time.

The display mode changing switch 9626 allows switching between a landscape mode and a portrait mode, color display and black-and-white display, and the like. The power saving mode changing switch 9625 can control display luminance in accordance with the amount of external light in use of the tablet terminal 9600, which is measured with an optical sensor incorporated in the tablet terminal 9600. In addition to the optical sensor, other detecting devices such as sensors for determining inclination, such as a gyroscope or an acceleration sensor, may be incorporated in the tablet terminal.

Although the display portion 9631a and the display portion 9631b have the same area in FIG. 29A, one embodiment of the present invention is not limited to this example. The display portion 9631a and the display portion 9631b may have different areas or different display quality. For example, one of the display portions 9631a and 9631b may display higher definition images than the other.

The tablet terminal is closed in FIG. 29B. The tablet terminal includes the housing 9630, a solar cell 9633, and a charge and discharge control circuit 9634 including a DC-DC converter 9636. The power storage unit of one embodiment of the present invention can be used as the power storage unit 9635.

The tablet terminal 9600 can be folded such that the housings 9630a and 9630b overlap with each other when not in use. Thus, the display portions 9631a and 9631b can be protected, which increases the durability of the tablet terminal 9600. In addition, the power storage unit 9635 of one embodiment of the present invention has flexibility and can be repeatedly bent without a significant decrease in charge and discharge capacity. Thus, a highly reliable tablet terminal can be provided.

The tablet terminal illustrated in FIGS. 29A and 29B can also have a function of displaying various kinds of data (e.g., a still image, a moving image, and a text image), a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processing portion, and the like. Note that the solar cell 9633 can be provided on one or both surfaces of the housing 9630 and the power storage unit 9635 can be charged efficiently. The use of a lithium-ion battery as the power storage unit 9635 brings an advantage such as a reduction in size.

Figure 29C:
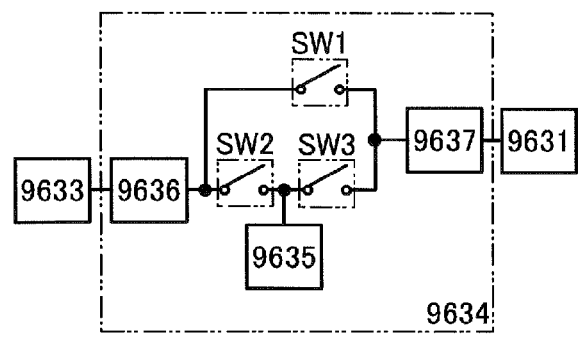

The structure and operation of the charge and discharge control circuit 9634 illustrated in FIG. 29B will be described with reference to a block diagram in FIG. 29C. The solar cell 9633, the power storage unit 9635, the DC-DC converter 9636, a converter 9637, switches SW1 to SW3, and the display portion 9631 are illustrated in FIG. 29C, and the power storage unit 9635, the DC-DC converter 9636, the converter 9637, and the switches SW1 to SW3 correspond to the charge and discharge control circuit 9634 in FIG. 29B.

First, an example of operation when electric power is generated by the solar cell 9633 using external light will be described. The voltage of electric power generated by the solar cell is raised or lowered by the DC-DC converter 9636 to a voltage for charging the power storage unit 9635. When the display portion 9631 operates with the electric power from the solar cell 9633, the switch SW1 is turned on and the voltage of the electric power is raised or lowered by the converter 9637 to a voltage needed for operating the display portion 9631. When display on the display portion 9631 is not performed, the switch SW1 is turned off and the switch SW2 is turned on, so that the power storage unit 9635 can be charged.

Note that the solar cell 9633 is described as an example of a power generation means; however, one embodiment of the present invention is not limited to this example. The power storage unit 9635 may be charged using another power generation means such as a piezoelectric element or a thermoelectric conversion element (Peltier element). For example, the power storage unit 9635 may be charged with a non-contact power transmission module capable of performing charging by transmitting and receiving electric power wirelessly (without contact), or any of the other charge means used in combination.

Figure 30:
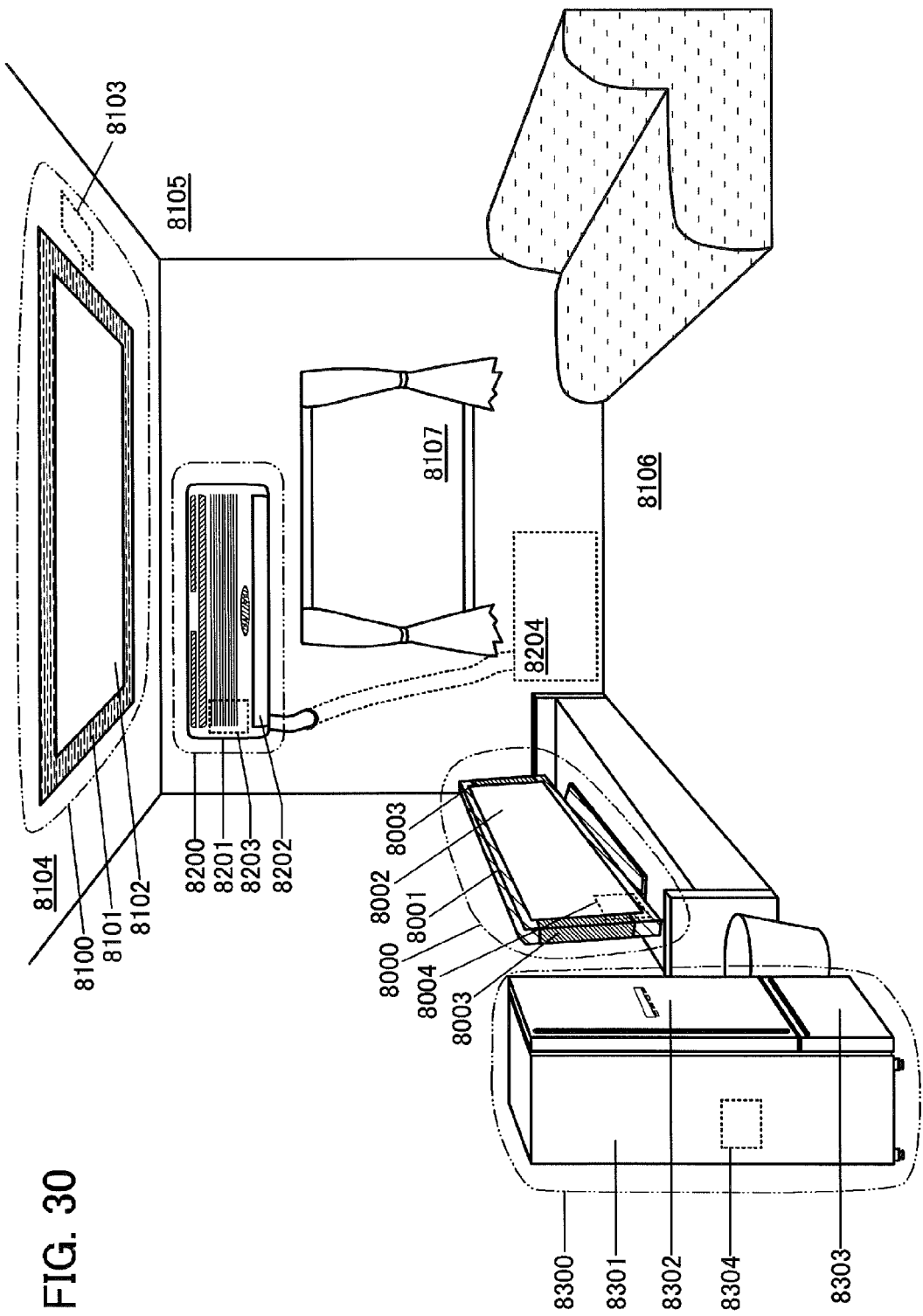
FIG. 30 illustrates examples of electronic devices.

FIG. 30 illustrates other examples of electronic devices. In FIG. 30, a display device 8000 is an example of an electronic device including a power storage device 8004 of one embodiment of the present invention. Specifically, the display device 8000 corresponds to a display device for TV broadcast reception and includes a housing 8001, a display portion 8002, speaker portions 8003, and the power storage device 8004. The power storage device 8004 of one embodiment of the present invention is provided in the housing 8001. The display device 8000 can receive electric power from a commercial power supply. Alternatively, the display device 8000 can use electric power stored in the power storage device 8004. Thus, the display device 8000 can operate with the use of the power storage device 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 30, an installation lighting device 8100 is an example of an electronic device including a power storage device 8103 of one embodiment of the present invention. Specifically, the lighting device 8100 includes a housing 8101, a light source 8102, and the power storage device 8103. Although FIG. 30 illustrates the case where the power storage device 8103 is provided in a ceiling 8104 on which the housing 8101 and the light source 8102 are installed, the power storage device 8103 may be provided in the housing 8101. The lighting device 8100 can receive electric power from a commercial power supply. Alternatively, the lighting device 8100 can use electric power stored in the power storage device 8103. Thus, the lighting device 8100 can operate with the use of the power storage device 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 30 as an example, the power storage device of one embodiment of the present invention can be used in an installation lighting device provided in, for example, a wall 8105, a floor 8106, or a window 8107 other than the ceiling 8104. Alternatively, the power storage device of one embodiment of the present invention can be used in a tabletop lighting device or the like.

As the light source 8102, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 30, an air conditioner including an indoor unit 8200 and an outdoor unit 8204 is an example of an electronic device including a power storage device 8203 of one embodiment of the present invention. Specifically, the indoor unit 8200 includes a housing 8201, an air outlet 8202, and the power storage device 8203. Although FIG. 30 illustrates the case where the power storage device 8203 is provided in the indoor unit 8200, the power storage device 8203 may be provided in the outdoor unit 8204. Alternatively, the power storage devices 8203 may be provided in both the indoor unit 8200 and the outdoor unit 8204. The air conditioner can receive electric power from a commercial power supply. Alternatively, the air conditioner can use electric power stored in the power storage device 8203. Particularly in the case where the power storage devices 8203 are provided in both the indoor unit 8200 and the outdoor unit 8204, the air conditioner can operate with the use of the power storage device 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 30 as an example, the power storage device of one embodiment of the present invention can be used in an air conditioner in which the functions of an indoor unit and an outdoor unit are integrated in one housing.

In FIG. 30, an electric refrigerator-freezer 8300 is an example of an electronic device including a power storage device 8304 of one embodiment of the present invention. Specifically, the electric refrigerator-freezer 8300 includes a housing 8301, a refrigerator door 8302, a freezer door 8303, and the power storage device 8304. The power storage device 8304 is provided in the housing 8301 in FIG. 30. The electric refrigerator-freezer 8300 can receive electric power from a commercial power supply. Alternatively, the electric refrigerator-freezer 8300 can use electric power stored in the power storage device 8304. Thus, the electric refrigerator-freezer 8300 can operate with the use of the power storage device 8304 of one embodiment of the present invention as an uninterruptible power supply even when electric power cannot be supplied from a commercial power supply due to power failure or the like.

Note that among the electronic devices described above, a high-frequency heating apparatus such as a microwave oven and an electronic device such as an electric rice cooker require high power in a short time. The tripping of a breaker of a commercial power supply in use of an electronic device can be prevented by using the power storage device of one embodiment of the present invention as an auxiliary power supply for supplying electric power which cannot be supplied enough by a commercial power supply.

In addition, in a time period when electronic devices are not used, particularly when the proportion of the amount of electric power which is actually used to the total amount of electric power which can be supplied from a commercial power supply source (such a proportion referred to as a usage rate of electric power) is low, electric power can be stored in the power storage device, whereby the usage rate of electric power can be reduced in a time period when the electronic devices are used. For example, in the case of the electric refrigerator-freezer 8300, electric power can be stored in the power storage device 8304 in nighttime when the temperature is low and the refrigerator door 8302 and the freezer door 8303 are not often opened or closed. On the other hand, in daytime when the temperature is high and the refrigerator door 8302 and the freezer door 8303 are frequently opened and closed, the power storage device 8304 is used as an auxiliary power supply; thus, the usage rate of electric power in daytime can be reduced.

The use of power storage devices in vehicles enables production of next-generation clean energy vehicles such as hybrid electric vehicles (HEVs), electric vehicles (EVs), and plug-in hybrid electric vehicles (PHEVs).

Figure 31A:
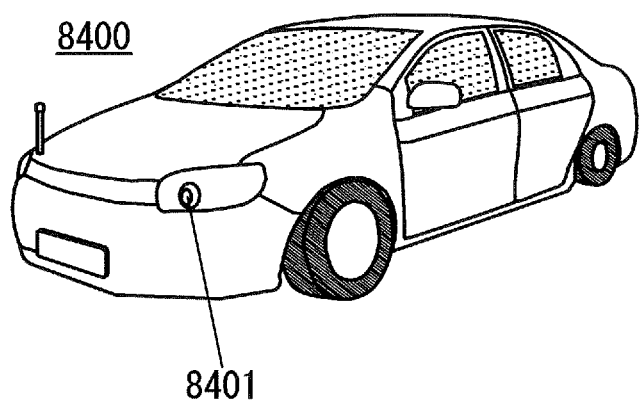
FIGS. 31A and 31B illustrate examples of electronic devices.
Figure 31B:
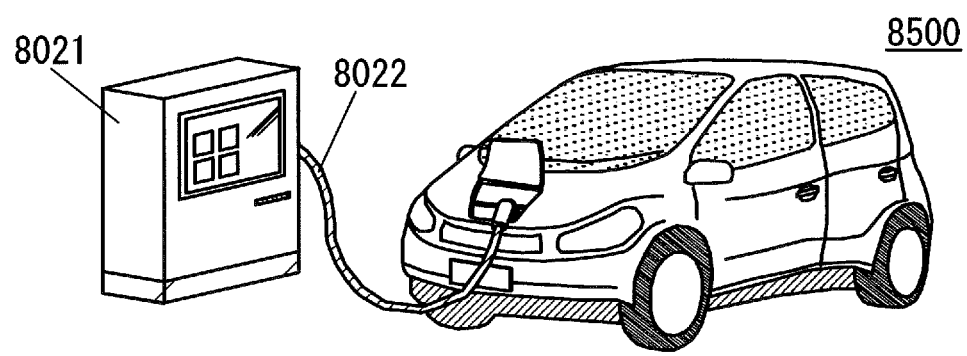

FIGS. 31A and 31B each illustrate an example of a vehicle using one embodiment of the present invention. An automobile 8400 illustrated in FIG. 31A is an electric vehicle that runs on the power of an electric motor. Alternatively, the automobile 8400 is a hybrid electric vehicle capable of driving appropriately using either the electric motor or the engine. One embodiment of the present invention can provide a high-mileage vehicle. The automobile 8400 includes the power storage device. The power storage device is used not only for driving an electric motor, but also for supplying electric power to a light-emitting device such as a headlight 8401 or a room light (not illustrated).

The power storage device can also supply electric power to a display device of a speedometer, a tachometer, or the like included in the automobile 8400. Furthermore, the power storage device can supply electric power to a semiconductor device included in the automobile 8400, such as a navigation system.

FIG. 31B illustrates an automobile 8500 including a power storage device. The automobile 8500 can be charged when the power storage device is supplied with electric power through external charging equipment by a plug-in system, a contactless power feeding system, or the like. In FIG. 31B, the power storage device included in the automobile 8500 is charged with the use of a charging apparatus 8021 through a cable 8022. In charging, a given method such as CHAdeMO (registered trademark) or Combined Charging System may be employed as a charging method, the standard of a connector, or the like as appropriate. The charging apparatus 8021 may be a charging station provided in a commerce facility or a power source in a house. For example, with the use of a plug-in technique, the power storage device included in the automobile 8500 can be charged by being supplied with electric power from outside. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the power storage device can have improved cycle characteristics and reliability. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the driving distance. Furthermore, the power storage device included in the vehicle can be used as a power source for supplying electric power to products other than the vehicle. In such a case, the use of a commercial power source can be avoided at peak time of electric power demand.

This embodiment can be implemented in appropriate combination with any of the other embodiments.

This application is based on Japanese Patent Application serial No. 2014-264926 filed with Japan Patent Office on Dec. 26, 2014, the entire contents of which are hereby incorporated by reference.

What is claimed is:

1. A material that is silicon oxide in which a part of silicon is replaced by atom M, wherein the atom M is boron, aluminum, or gallium, wherein a proportion of oxygen atoms to silicon atoms is greater than 1.5 and less than or equal to 2.5.

2. The material according to claim 1, wherein the atom M and oxygen are bonded by an ionic bond or a covalent bond.

3. The material according to claim 1, wherein a proportion of the atoms M to silicon atoms is greater than or equal to 0.01 and less than or equal to 0.11.

4. A storage battery comprising:
a negative electrode active material comprising the material according to claim 1.

5. A negative electrode active material that is the material according to claim 1.

6. A material that is $Si_{(1-x)}M_xO_y$ (M=B, Al, or Ga; x and y satisfy that a proportion of M atoms to silicon atoms is greater than or equal to 0.01 and less than or equal to 0.11 and a proportion of oxygen atoms to silicon atoms is greater than 1.5 and less than or equal to 2.5).

7. The material according to claim 6, wherein the material is $Si_{(1-x)}B_xO_y$, x and y satisfy that a proportion of M atoms to silicon atoms is greater than or equal to 0.01 and less than or equal to 0.11 and a proportion of oxygen atoms to silicon atoms is greater than 1.5 and less than or equal to 2.5).

8. The material according to claim 6, wherein the material is $Si_{(1-x)}Al_xO_y$, x and y satisfy that a proportion of M atoms to silicon atoms is greater than or equal to 0.01 and less than or equal to 0.11 and a proportion of oxygen atoms to silicon atoms is greater than 1.5 and less than or equal to 2.5).

9. The material according to claim 6, wherein the material is $Si_{(1-x)}Ga_xO_y$, x and y satisfy that a proportion of M atoms to silicon atoms is greater than or equal to 0.01 and less than or equal to 0.11 and a proportion of oxygen atoms to silicon atoms is greater than 1.5 and less than or equal to 2.5).

10. A storage battery comprising:
a negative electrode active material comprising the material according to claim 6.

11. A negative electrode active material that is the material according to claim 6.

12. A material that is $Si_{(1-x)}M_xO_2$ (M=B, Al, or Ga; $0.01/1.01 \leq x \leq 0.11/1.11$).

13. The material according to claim 12, wherein the material is $Si_{(1-x)}B_xO_2 (0.01/1.01 \leq x \leq 0.11/1.11)$.

14. The material according to claim 12, wherein the material is $Si_{(1-x)}Al_xO_2 (0.01/1.01 \leq x \leq 0.11/1.11)$.

15. The material according to claim 12, wherein the material is $Si_{(1-x)}Ga_xO_2 (0.01/1.01 \leq x \leq 0.11/1.11)$.

16. A storage battery comprising:
a negative electrode active material comprising the material according to claim 12.

17. A negative electrode active material that is the material according to claim 12.

18. A silicon oxide comprising atom M, wherein the atom M is boron, aluminum, or gallium, wherein a proportion of oxygen atoms to silicon atoms is greater than 1.5 and less than or equal to 2.5.

19. The silicon oxide according to claim 18, wherein the atom M and oxygen are bonded by an ionic bond or a covalent bond.

20. The silicon oxide according to claim 18, wherein a proportion of the atoms M to silicon atoms is greater than or equal to 0.01 and less than or equal to 0.11.

21. A storage battery comprising:
    a negative electrode active material comprising the silicon oxide according to claim 18.

22. A negative electrode active material that is the silicon oxide according to claim 18.

23. A silicon oxide comprising silicon, oxygen, atom M and lithium, wherein the atom M is boron, aluminum, or gallium, wherein a proportion of oxygen atoms to silicon atoms is greater than 1.5 and less than or equal to 2.5.

24. The silicon oxide according to claim 23, wherein the atom M and oxygen are bonded by an ionic bond or a covalent bond.

25. The silicon oxide according to claim 23, wherein a proportion of the atoms M to silicon atoms is greater than or equal to 0.01 and less than or equal to 0.11.

26. A storage battery comprising:
    a negative electrode active material comprising the silicon oxide according to claim 23.

27. A negative electrode active material that is the silicon oxide according to claim 23.

\* \* \* \* \*

UNITED STATES PATENT AND TRADEMARK OFFICE
CERTIFICATE OF CORRECTION

PATENT NO. : 9,865,871 B2
APPLICATION NO. : 14/972796
DATED : January 9, 2018
INVENTOR(S) : Hiroyuki Miyake et al.

It is certified that error appears in the above-identified patent and that said Letters Patent is hereby corrected as shown below:

In the Claims

In Claim 7, at Column 26, Line 28, "x and" should be --(x and--;

In Claim 8, at Column 26, Line 33, "x and" should be --(x and--;

In Claim 9, at Column 26, Line 38, "x and" should be --(x and--.

Signed and Sealed this
Tenth Day of April, 2018

Andrei Iancu
*Director of the United States Patent and Trademark Office*